(12) United States Patent
Zitkovic et al.

(10) Patent No.: US 10,800,648 B2
(45) Date of Patent: Oct. 13, 2020

(54) FUNNEL FOR A FUEL TANK FILLER PIPE

(71) Applicant: Ford Global Technologies, LLC, Dearborn, MI (US)

(72) Inventors: Mike Zitkovic, Dearborn, MI (US); Xiankai Song, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/898,150

(22) Filed: Feb. 15, 2018

(65) Prior Publication Data
US 2018/0251368 A1    Sep. 6, 2018

Related U.S. Application Data

(60) Provisional application No. 62/465,746, filed on Mar. 1, 2017.

(51) Int. Cl.
| | |
|---|---|
| *B60K 15/04* | (2006.01) |
| *B67D 7/54* | (2010.01) |
| *B67D 7/50* | (2010.01) |
| *B60K 15/03* | (2006.01) |
| *B60K 15/035* | (2006.01) |

(52) U.S. Cl.
CPC ............. *B67D 7/50* (2013.01); *B60K 15/04* (2013.01); *B60K 15/0403* (2013.01); *B67D 7/54* (2013.01); *B60K 2015/03375* (2013.01); *B60K 2015/03595* (2013.01); *B60K 2015/047* (2013.01); *B60K 2015/049* (2013.01); *B60K 2015/0429* (2013.01); *B60K 2015/0477* (2013.01); *B60K 2015/0483* (2013.01)

(58) Field of Classification Search
CPC .......... B60K 15/0403; B60K 2015/049; B60K 2015/0477; B60K 2015/0429; B60K 2015/0483; B60K 2115/03595; B67D 7/54

USPC .......... 141/86, 332, 335, 344, 350; 220/86.2
See application file for complete search history.

(56) References Cited

U.S. PATENT DOCUMENTS

| | | | | |
|---|---|---|---|---|
| 4,995,433 | A | * | 2/1991 | Beicht ................... B60K 15/04 141/312 |
| 5,662,149 | A | * | 9/1997 | Armellino ............. B63B 25/082 114/343 |
| 5,839,489 | A | * | 11/1998 | Ganachaud ............ B60K 15/04 141/382 |

(Continued)

FOREIGN PATENT DOCUMENTS

| | | |
|---|---|---|
| WO | 2008059228 A1 | 5/2008 |
| WO | 2012057660 A1 | 5/2012 |

OTHER PUBLICATIONS

Song, X. et al., "Insert for a Fuel Tank Filler Pipe," U.S. Appl. No. 15/898,131, filed Feb. 15, 2018, 82 pages.

*Primary Examiner* — Matthew W Jellett
(74) *Attorney, Agent, or Firm* — Geoffrey Brumbaugh; McCoy Russell LLP

(57) ABSTRACT

Systems are provided for refueling a fuel tank of a motor vehicle via a funnel including an insert. In one example, a system may include a funnel including an insert coupled to an inner circumference of the funnel, the insert including a plurality of projections positioned on an inner perimeter of the insert. The plurality of projections may include a first projection spanning a first axial length, a second projection spanning a second axial length, and a third projection spanning a third axial length.

20 Claims, 20 Drawing Sheets

(56) References Cited

U.S. PATENT DOCUMENTS

| | | | |
|---|---|---|---|
| 5,878,795 A * | 3/1999 | Armellino | B63B 25/082 |
| | | | 141/86 |
| 5,899,249 A * | 5/1999 | Armellino | B67D 7/421 |
| | | | 141/382 |
| 6,374,868 B1 | 4/2002 | Channing | |
| 6,880,593 B1 * | 4/2005 | Swane | B29C 66/61 |
| | | | 141/286 |
| 7,665,492 B2 | 2/2010 | Burstein et al. | |
| 7,950,425 B2 | 5/2011 | Och | |
| 8,490,661 B1 | 7/2013 | Leipold et al. | |
| 8,555,937 B2 * | 10/2013 | Murabayashi | B60K 15/04 |
| | | | 141/312 |
| 9,187,307 B2 * | 11/2015 | Fox | B67C 11/02 |
| 9,233,823 B2 * | 1/2016 | Fox | B67C 11/02 |
| 9,296,292 B2 * | 3/2016 | Stancu | B60K 15/04 |
| 9,505,302 B2 * | 11/2016 | Yoshida | B60K 15/04 |
| 9,701,194 B2 * | 7/2017 | Groom | B60K 15/04 |
| 10,059,198 B2 * | 8/2018 | Sperando | B60K 15/04 |
| 2013/0327768 A1 * | 12/2013 | Kataoka | B60K 15/04 |
| | | | 220/86.2 |
| 2014/0284329 A1 * | 9/2014 | Frank | B60K 15/03006 |
| | | | 220/86.2 |
| 2014/0332530 A1 * | 11/2014 | Groom | B60K 15/04 |
| | | | 220/86.2 |
| 2016/0009173 A1 * | 1/2016 | Sperando | B60K 15/04 |
| | | | 220/86.2 |
| 2016/0039280 A1 * | 2/2016 | Kim | B60K 15/04 |
| | | | 220/86.2 |
| 2018/0050586 A1 | 2/2018 | Song et al. | |
| 2018/0251368 A1 * | 9/2018 | Zitkovic | B67D 7/50 |

* cited by examiner

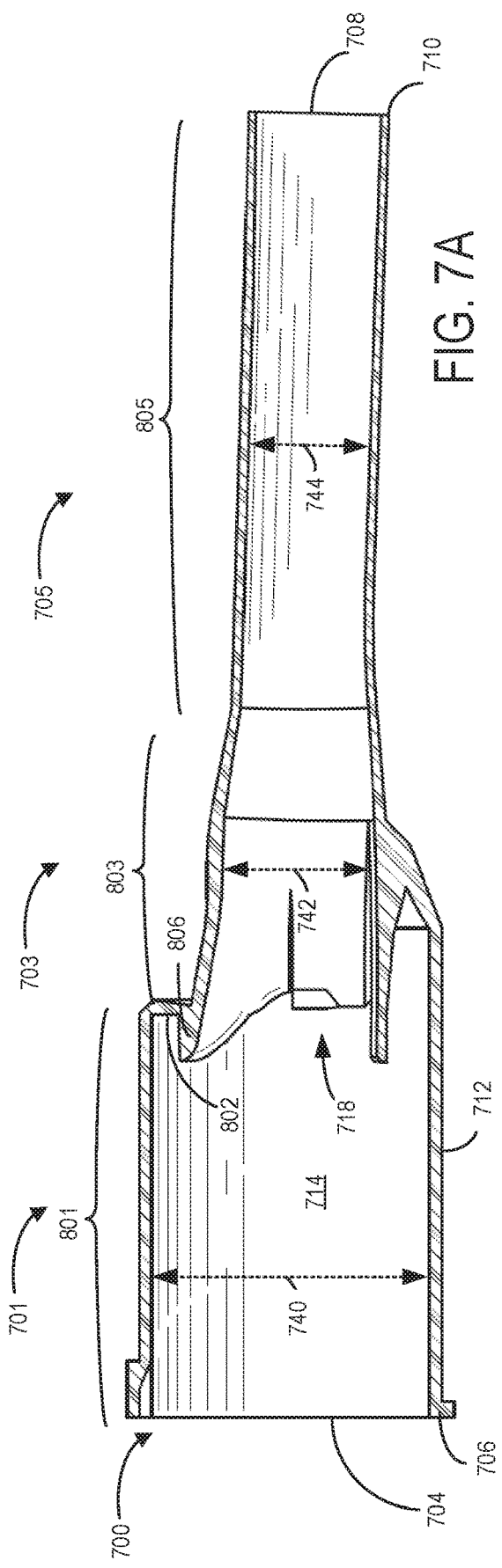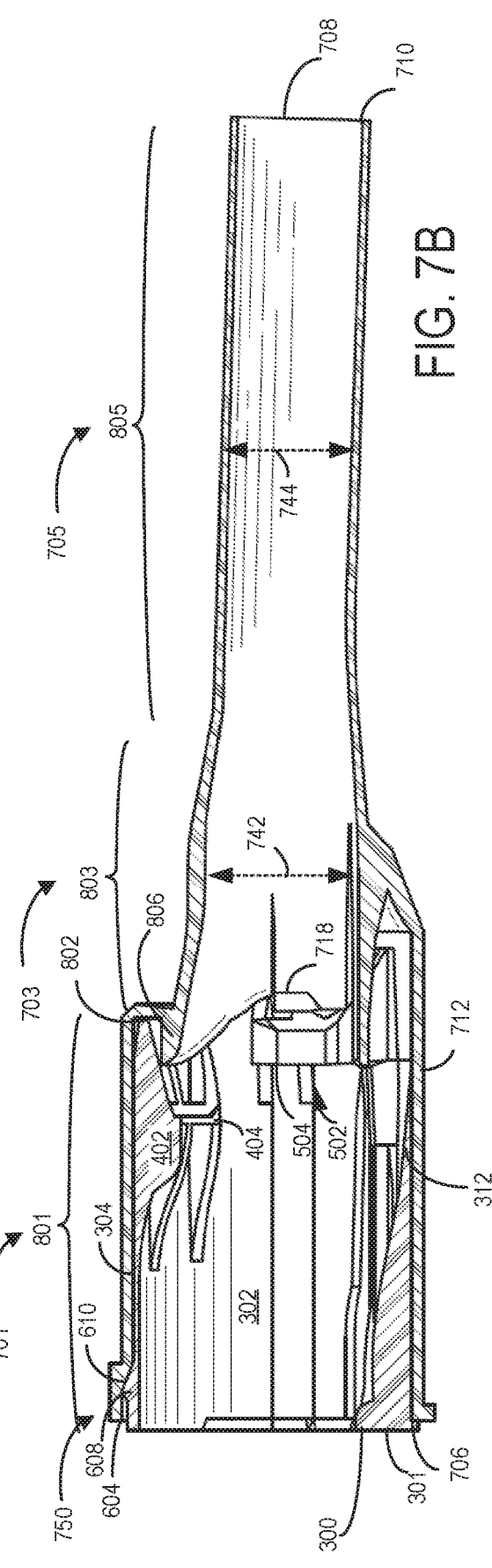

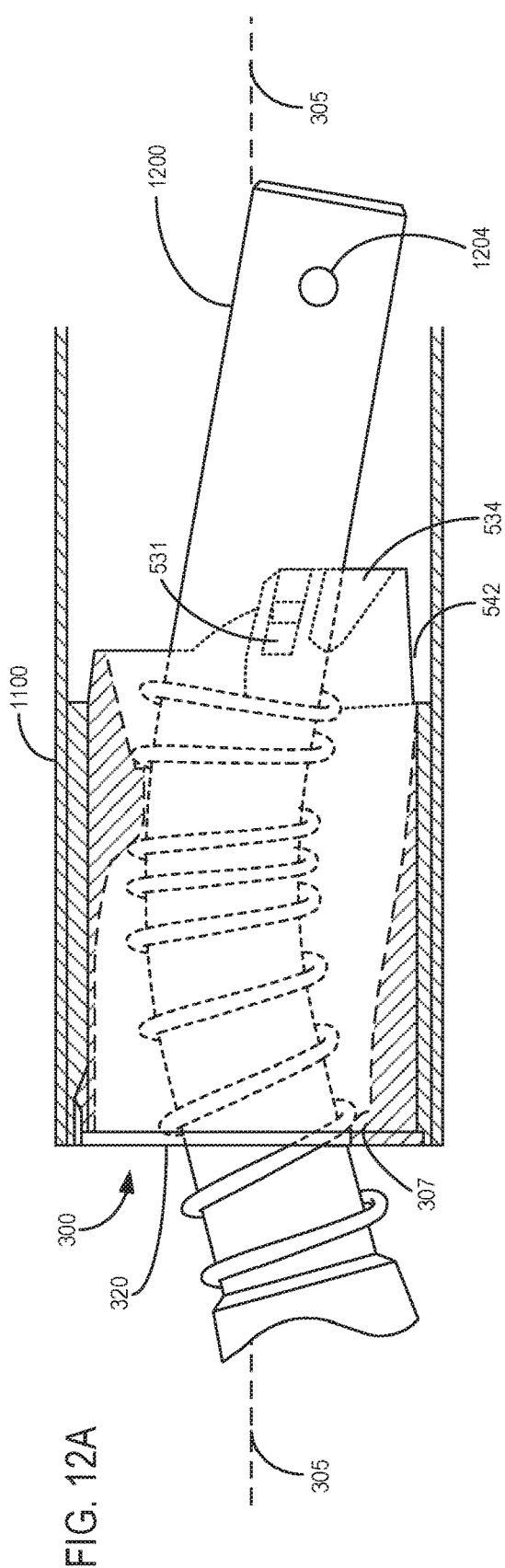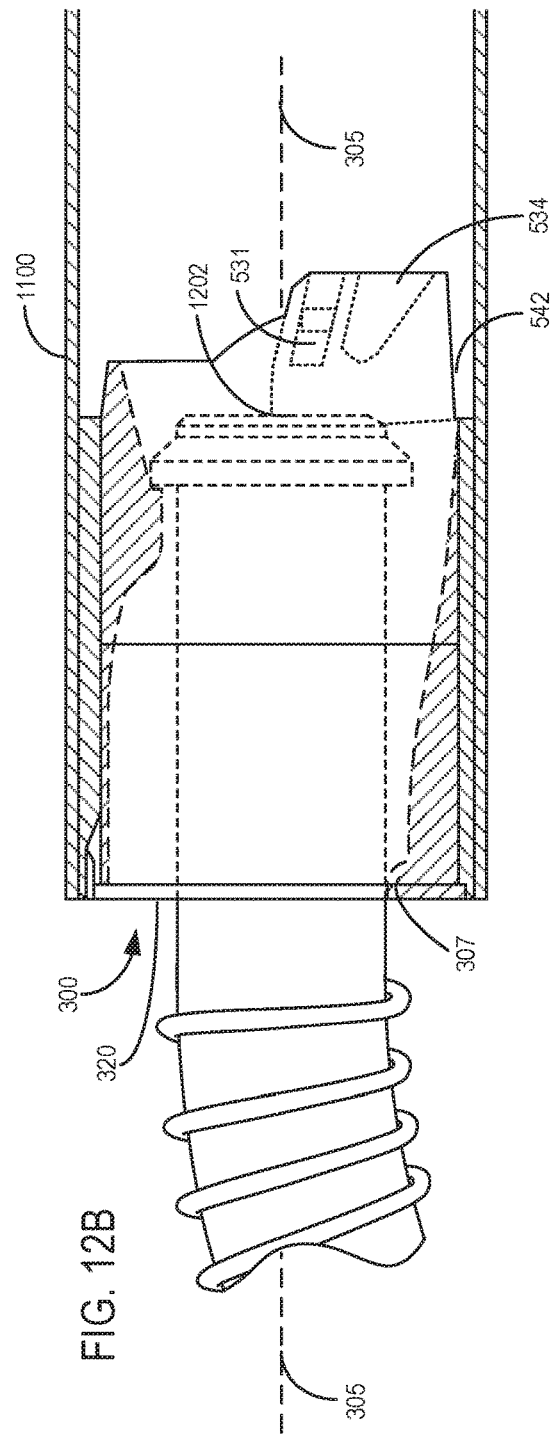

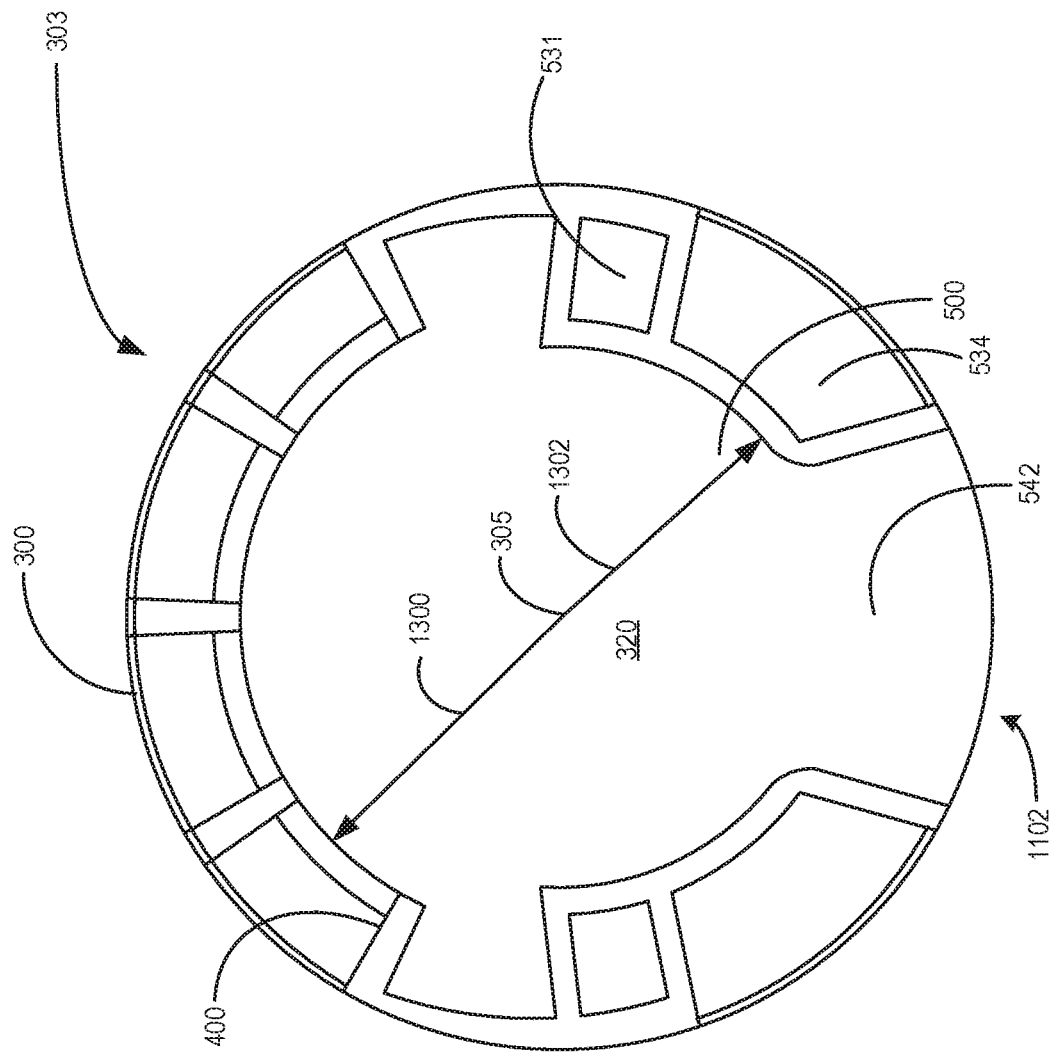

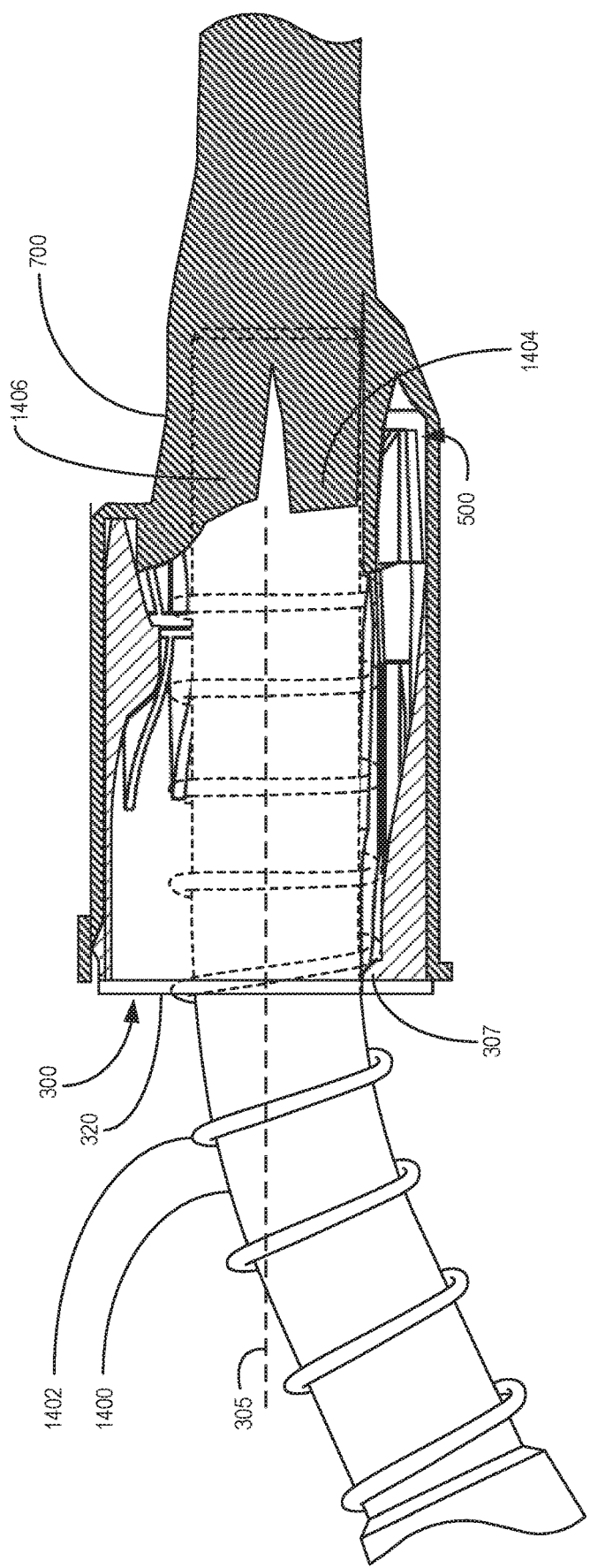

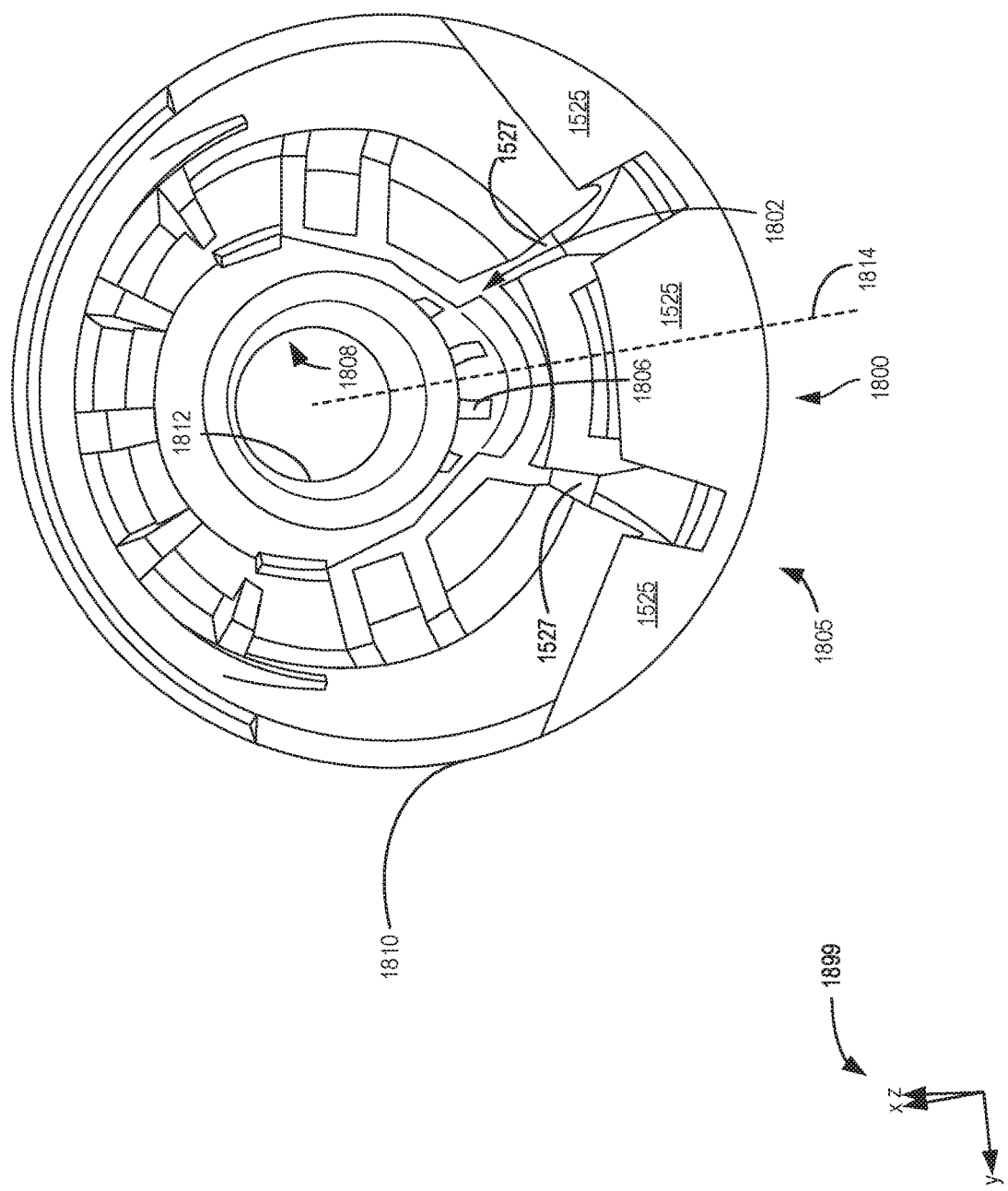

FUNNEL FOR A FUEL TANK FILLER PIPE

CROSS REFERENCE TO RELATED APPLICATION

The present application claims priority to U.S. Provisional Patent Application No. 62/465,746 entitled "Funnel for a Fuel Tank Filler Pipe," filed on Mar. 1, 2017. The entire contents of the above-referenced application are hereby incorporated by reference in its entirety for all purposes.

FIELD

The present description relates to a system for supplying fluid into a diesel fuel tank having a filler pipe in a motor vehicle.

BACKGROUND AND SUMMARY

Refueling assemblies for engines have been developed to enable an operator to quickly and easily refill a fuel tank. However, in some vehicles such as larger diesel trucks, it is often challenging to maintain a refueling nozzle securely with the opening of a truck filler pipe. In particular, the fuel nozzle may disengage from within the filler pipe upstream of the fuel tank due to fuel surges through the nozzle, a vehicle operator forgetting the refueling nozzle is coupled to the vehicle and driving away, etc., creating undesirable and costly fuel spills. Thus, a support structure provided for maintaining a refueling nozzle securely within the inlet of a filler pipe upstream of a fuel tank may be desired.

Further, refueling nozzles are often manufactured in various sizes and varying lengths depending on the type of fluid dispensed. For example, in some cases, if the filler pipe length is not adequate, certain refueling nozzles may not fill a fuel tank of the vehicle to a desired level. Thus, an amount of fuel inside the fuel tank of the motor vehicle is less than the desired level.

Other attempts to address undesirable fit and/or orientation of various nozzles into the filler pipe of a motor vehicle includes including nozzle holding structures welded on an inner surface of the filler pipe. One example approach is shown by Burstein et al. in U.S. Pat. No. 7,665,492. Therein, a nozzle support funnel is provided a top conical section and a bottom smaller opening neck section. The top conical section has a top rim configured to seat over the fuel inlet opening of a truck fuel tank with the top conical section extending into the fuel tank. The funnel is provided with a plurality with openings to allow air to escape the fuel tank, and may also be made of a metal, such as aluminum, which is expensive for manufacturing. Further, the funnel may be welded on an inner surface of the filler pipe to engage with a refueling nozzle, thereby increasing time of manufacturing and added expenses. In some cases, the nozzle support structure of Burstein et al. disposed in the filler pipe may still cause premature shut off of the refueling event due to a lack of features that may securely engage with the refueling nozzle. In this way, inadequate levels of fuel in the motor vehicle may occur.

In one example, the issues described above may be addressed by a refueling funnel for a vehicle, comprising: an insert coupled to an inner perimeter of the funnel, the insert including: an inner surface having a first projection positioned at a first end and a second projection positioned at a second end, with the first projection and second projection each extending radially inward toward an insert central axis; and an aperture positioned at the second end of the insert adjacent to the second projection. In this way, a secure connection may be provided between a refueling nozzle and the fuel tank during a refueling event, for example, to effectively and rapidly supply fuel to a fuel system, and to distinguish gasoline from diesel fuel nozzles.

As one example, the first end is positioned at an outer end of the funnel when the insert is coupled to the funnel. The insert may include a third projection positioned on the inner surface of the insert adjacent to the second projection at the second end of the insert, with the second projection positioned between the first end and the second end. Additionally, each of the projections may form apertures, either by extending the projections in a direction parallel to a central axis of the insert, or by providing a flow path through each projection. As a result, the projections and apertures may remove fuel flow restriction while retaining structural durability to provide guidance, constraint, and fastened engagement of the refueling nozzle to the funnel during refueling events, with the funnel inserted into the filler pipe. Thus, a likelihood of premature nozzle shut off may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIGS. 7A and 7B show a side cross-sectional view of the example funnel, and a side cross-sectional view of the example funnel coupled to the first embodiment of the insert.

FIGS. 12A-12B each show the first embodiment of the insert coupled with a filler pipe, and with a fuel nozzle coupled with the insert.

FIG. 13 shows a view of an end of the example insert, including the second and third projections, and the second and third apertures.

FIG. 14 shows a partial cross-sectional view of a fuel nozzle coupled to the example insert.

FIGS. 18-20 each show different views of a second alternate embodiment of a funnel, with the funnel including a fluid reservoir and a fence with a plurality of slots.

FIGS. 2-20 are drawn approximately to scale, though other relative dimensions may be used.

DETAILED DESCRIPTION

Figure 1:
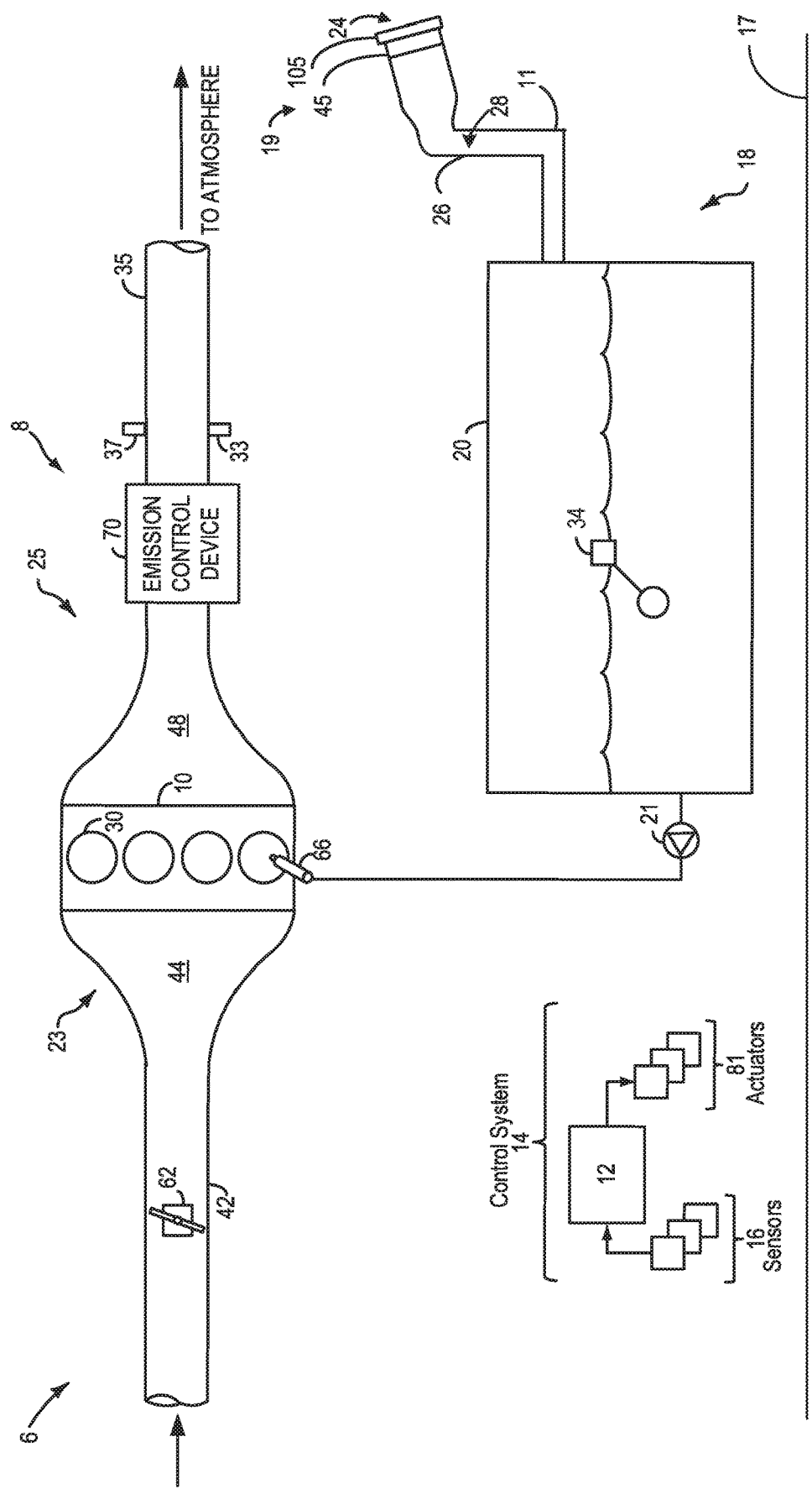
FIG. 1 shows a schematic depiction of a vehicle having an engine and a refueling assembly.
Figure 2A:
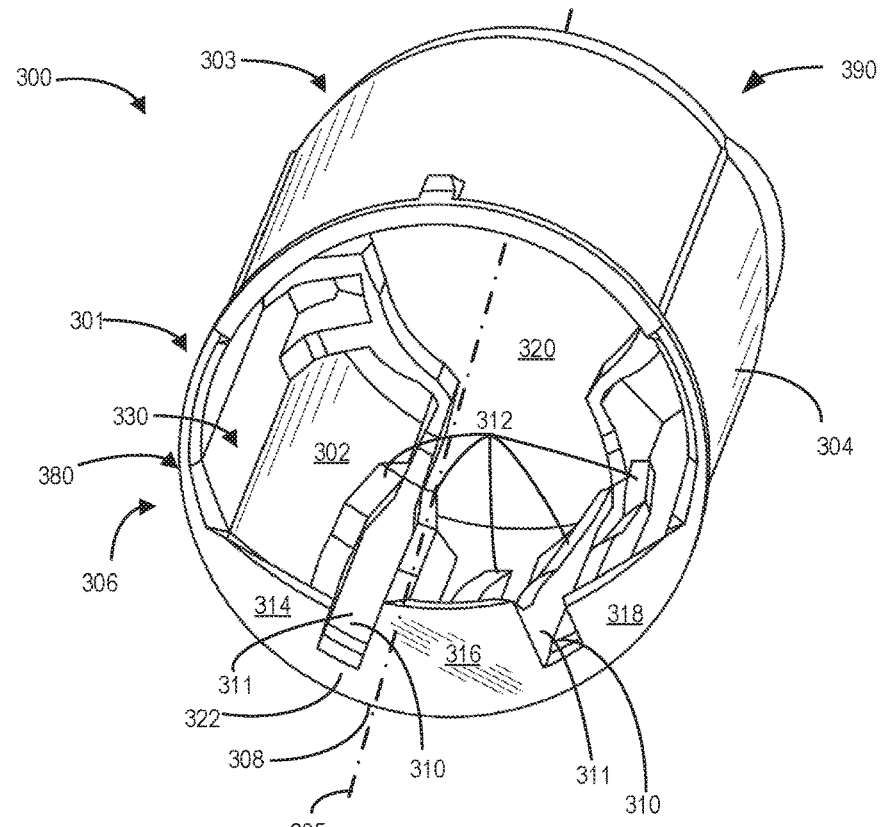
FIGS. 2A and 2B show a front perspective view and a back perspective view, respectively, of a first projection and first aperture of a first embodiment of an insert for a filler pipe.
Figure 2B:
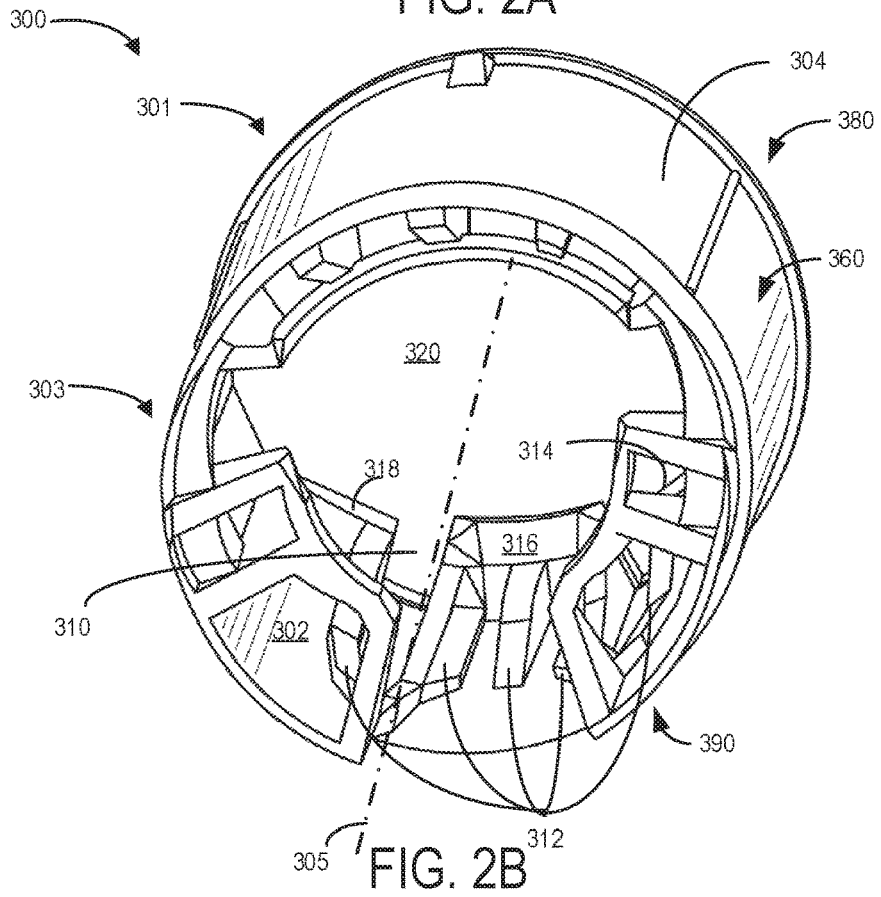
Figure 3A:
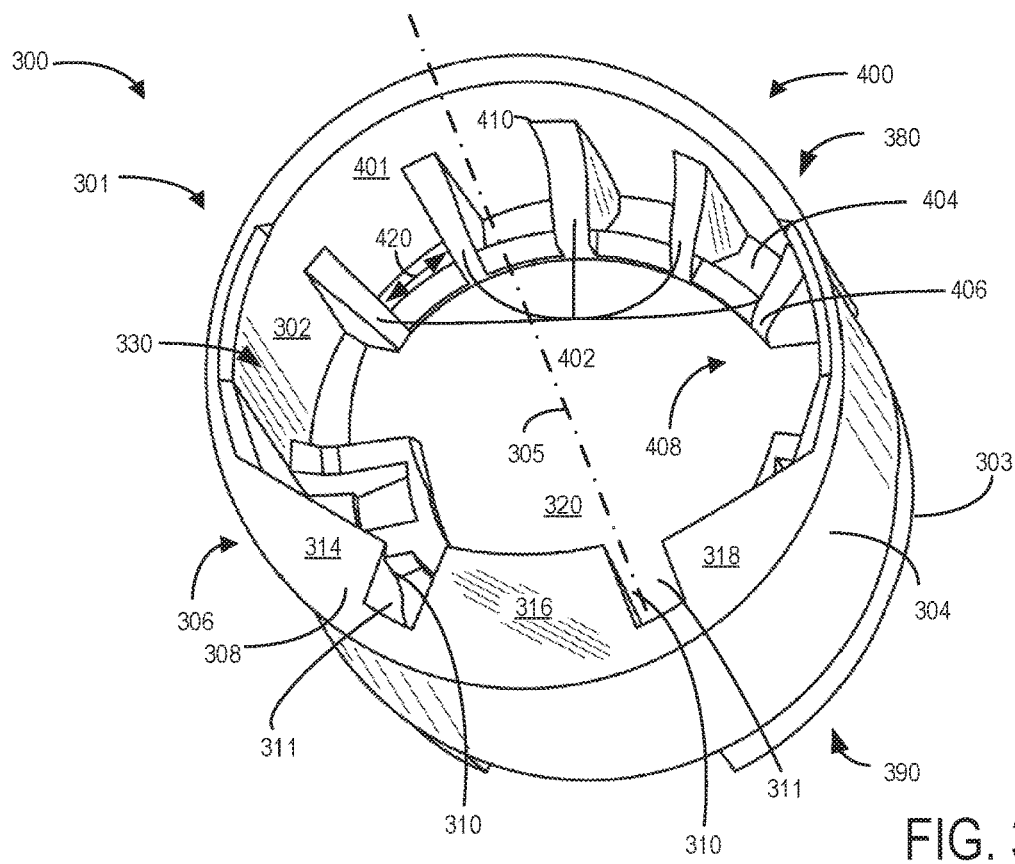
FIGS. 3A and 3B show a front perspective view and a back perspective view, respectively, of a second projection and second aperture of the first embodiment of the insert.
Figure 3B:
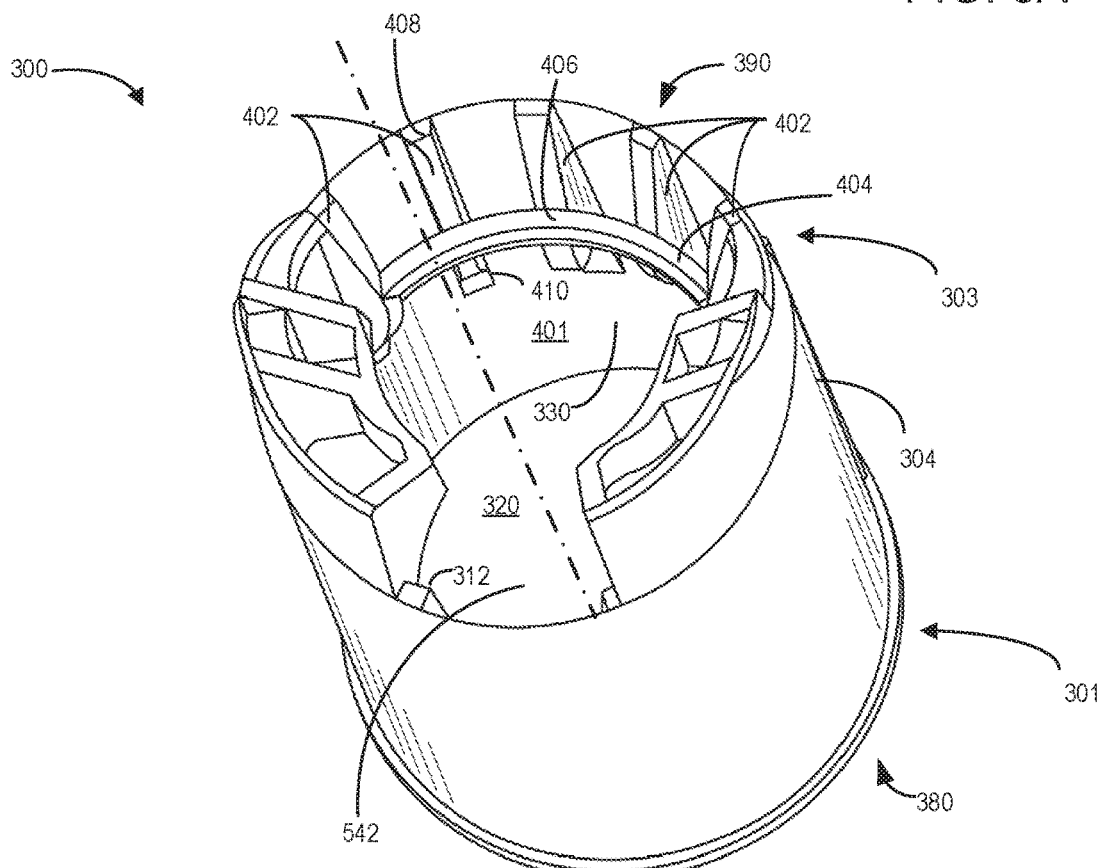
Figure 4A:
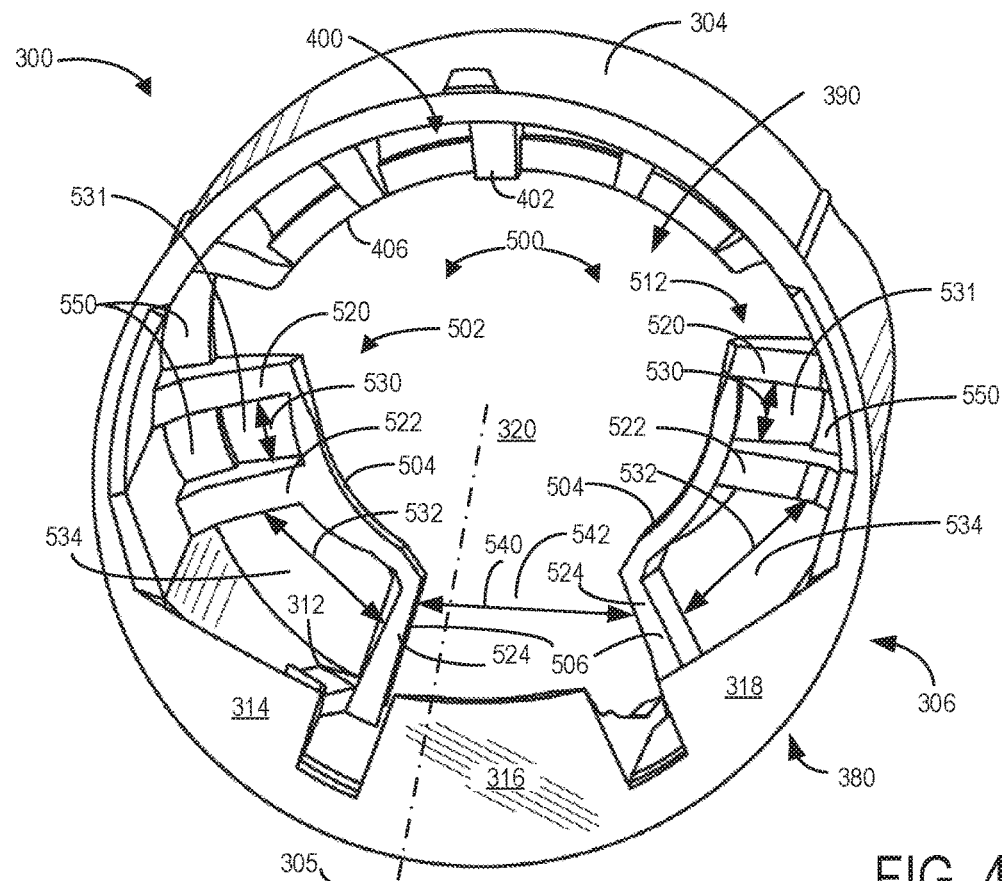
FIGS. 4A and 4B show perspective views of a third projection and third aperture of the first embodiment of the insert.
Figure 4B:
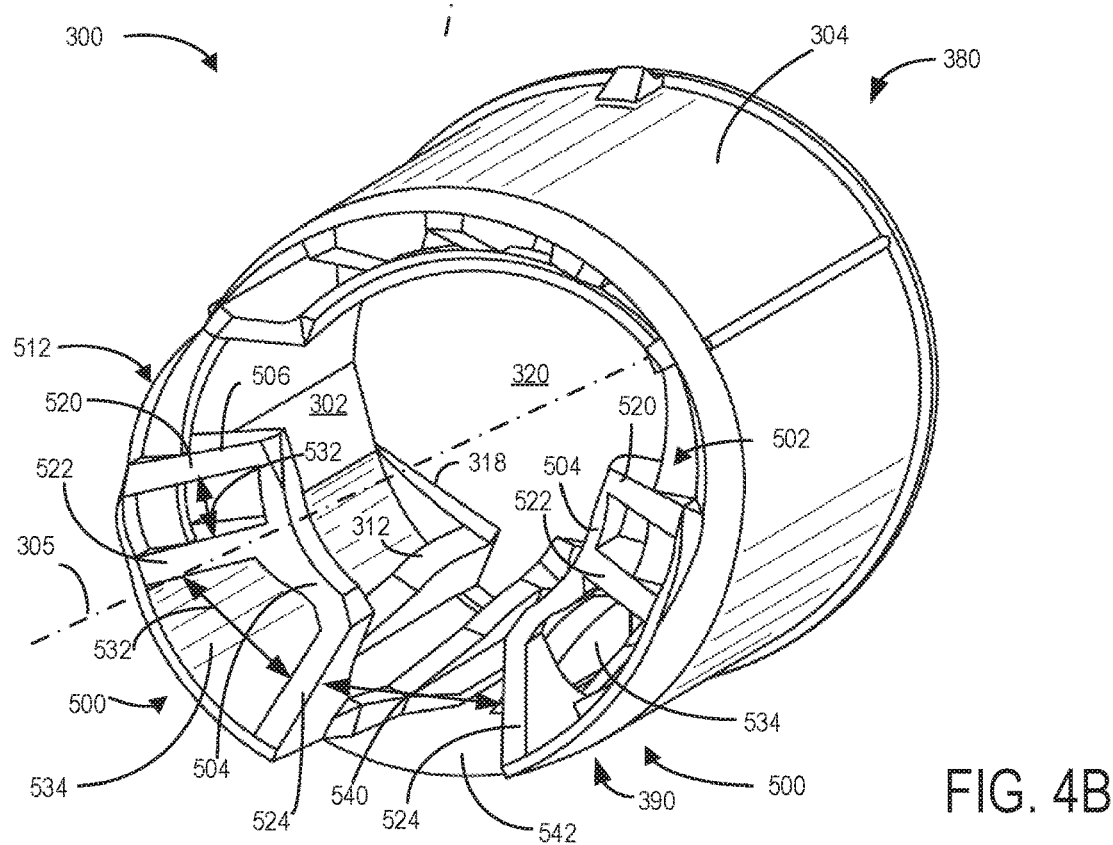
Figure 5A:
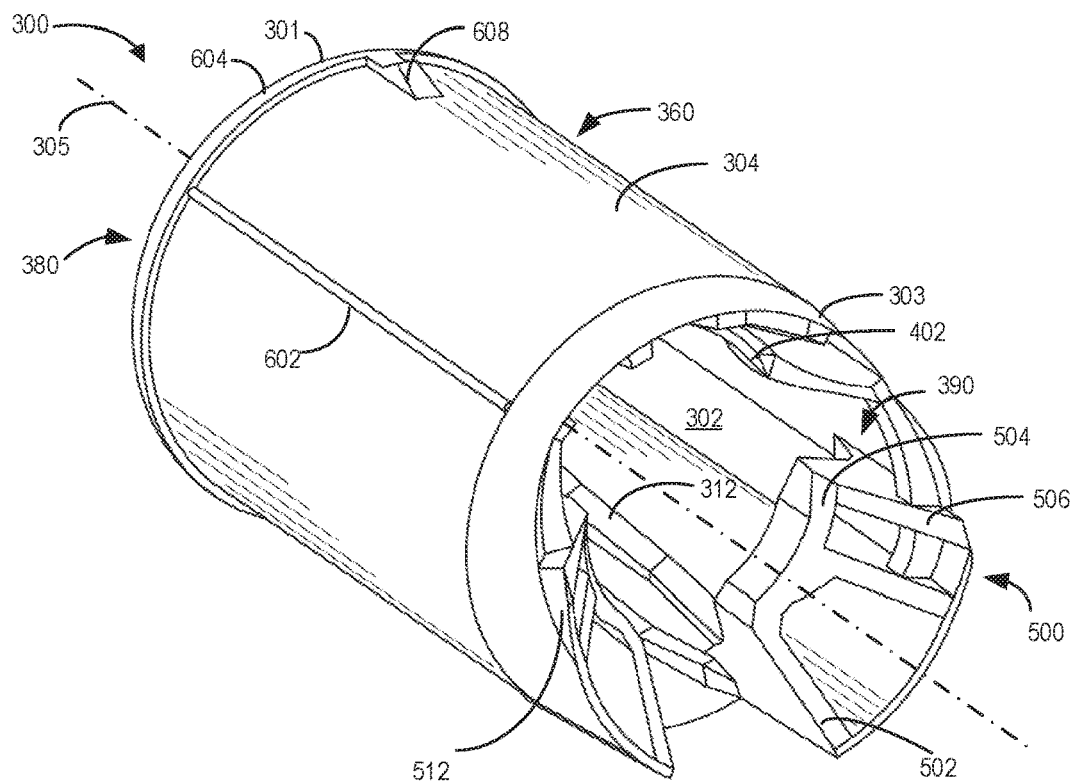
FIGS. 5A and 5B show a back perspective view and sectional view of the first embodiment of the insert, including the first projection, second projection, and third projection, and the respective apertures.
Figure 5B:
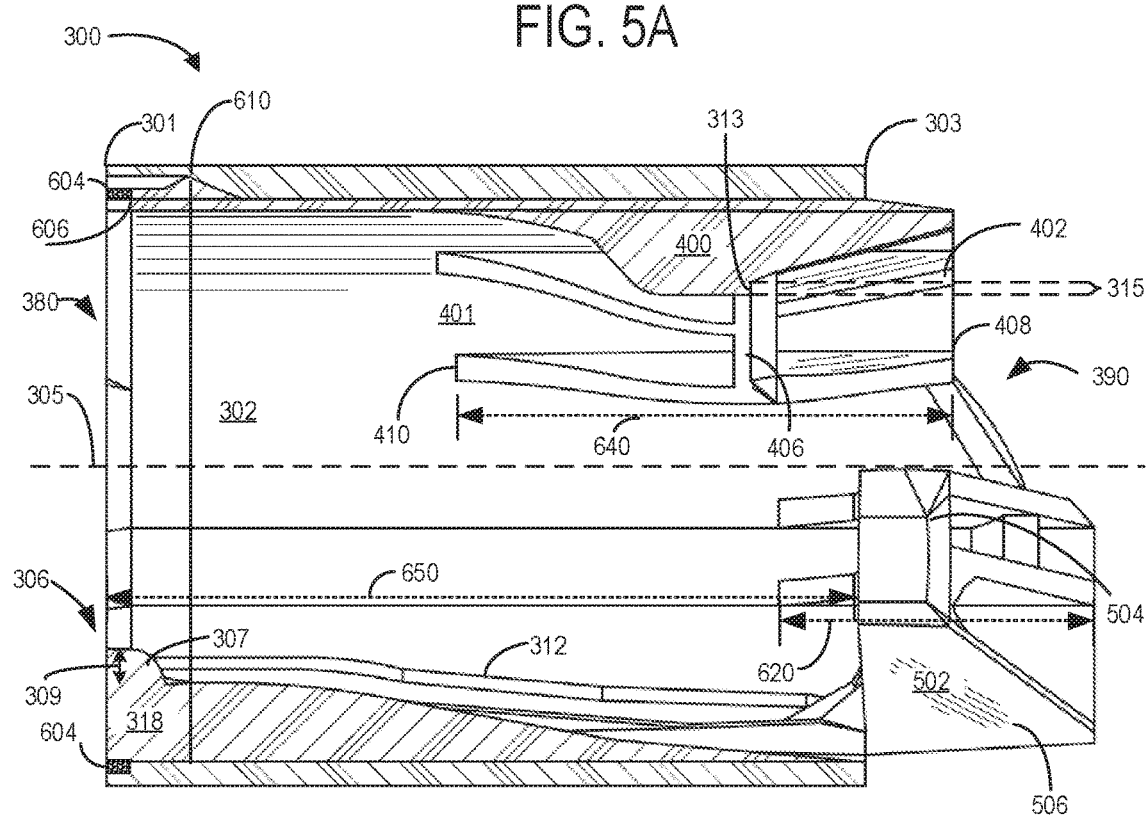
Figure 15:
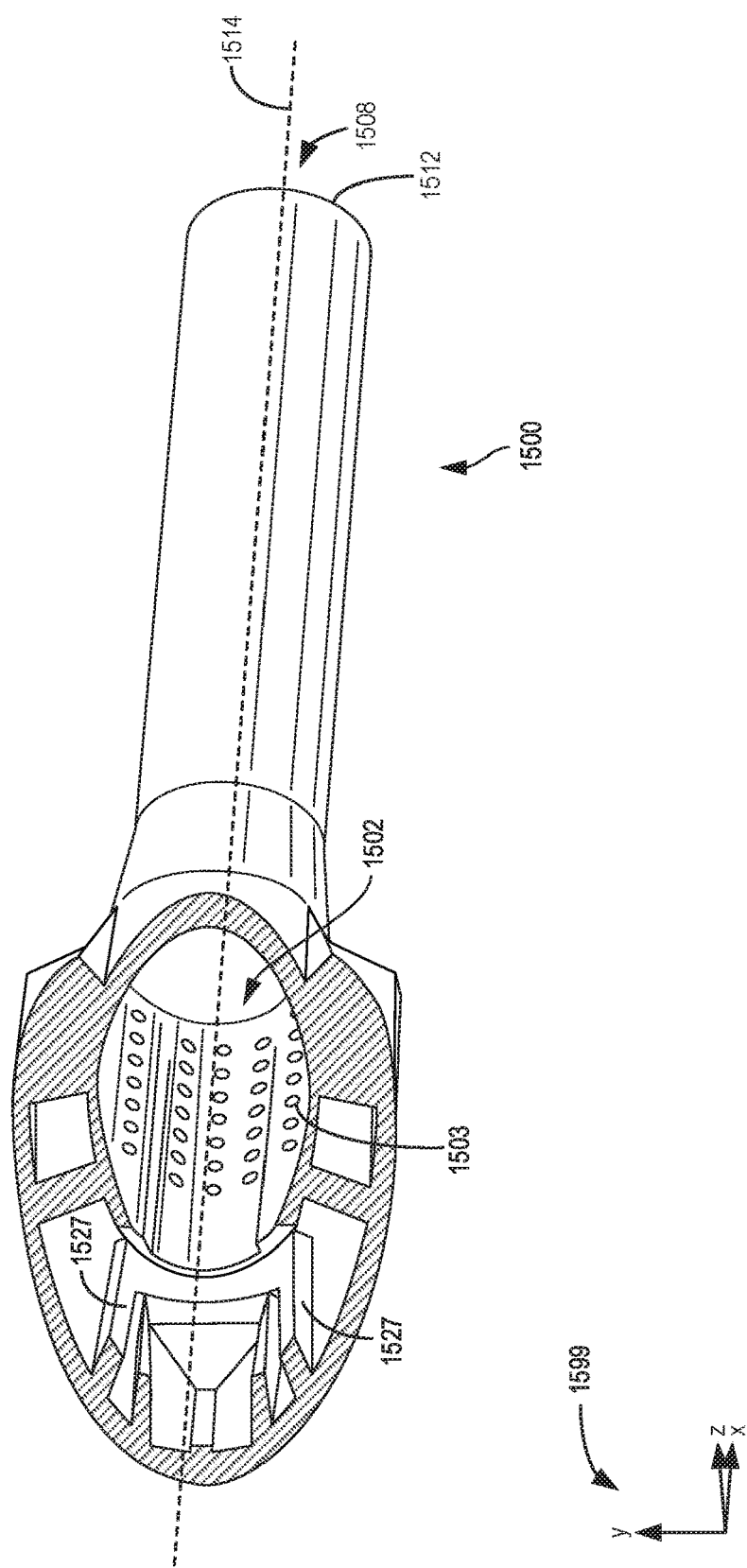
FIGS. 15-17 each show different views of a first alternate embodiment of a funnel, with the funnel including a fluid reservoir and a fence with a plurality of apertures.
Figure 16:
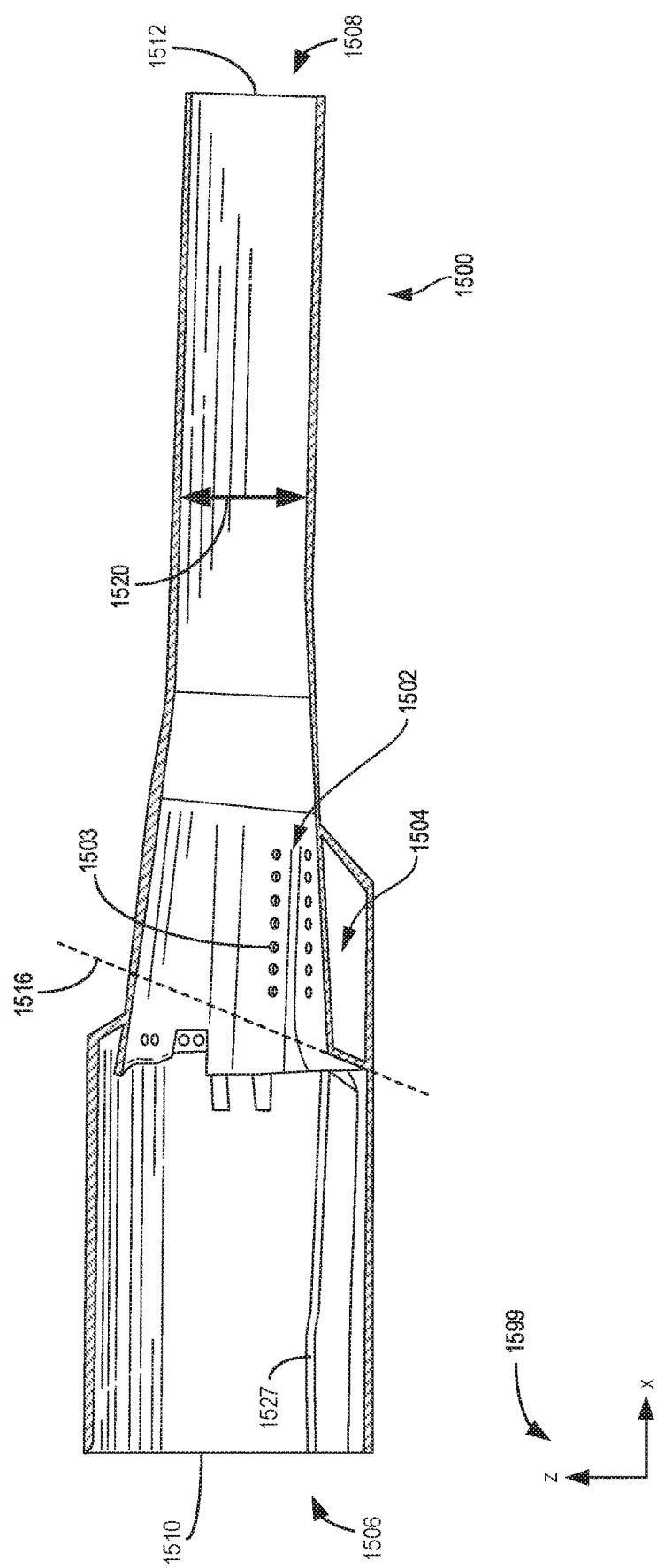
Figure 17:
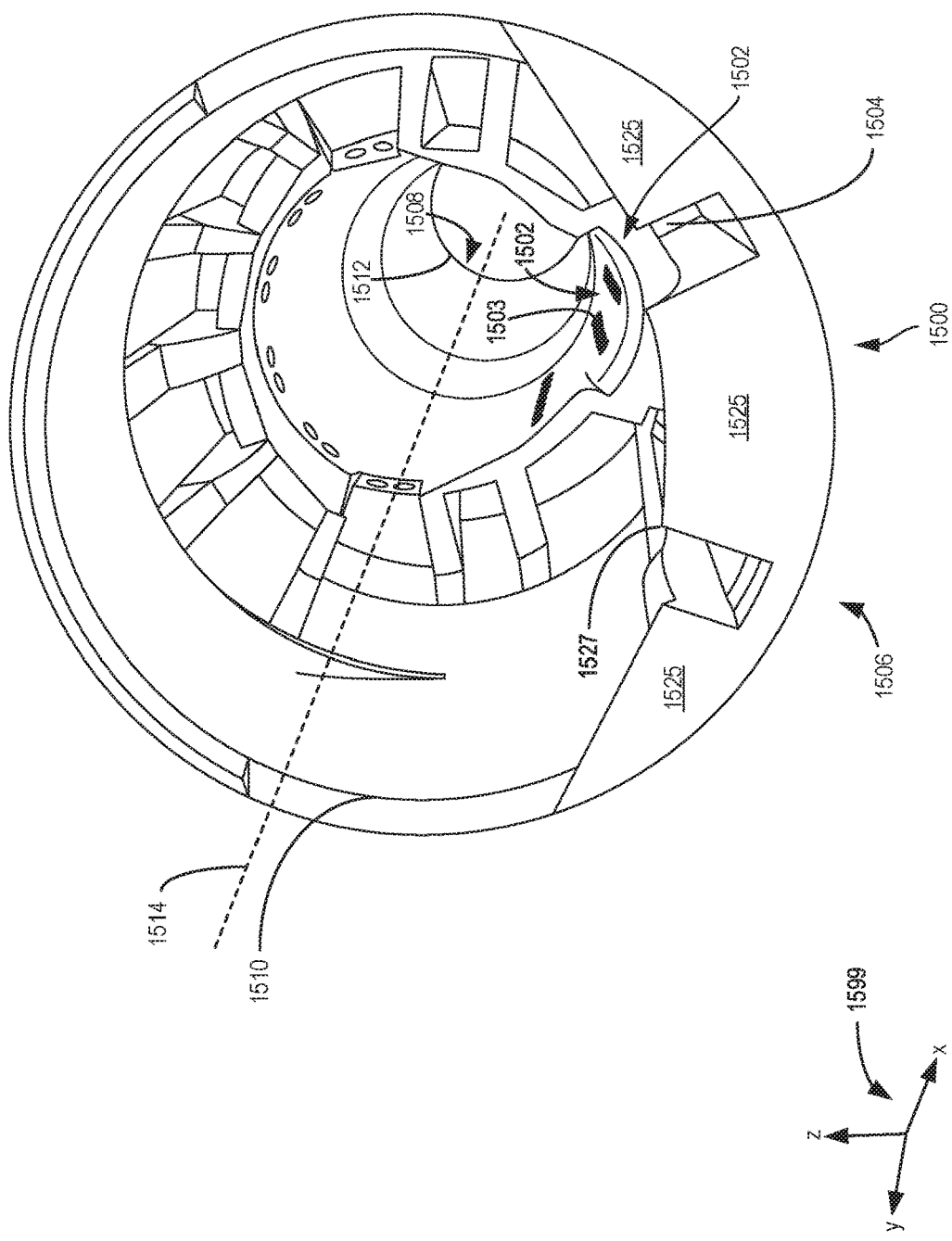
Figure 18:
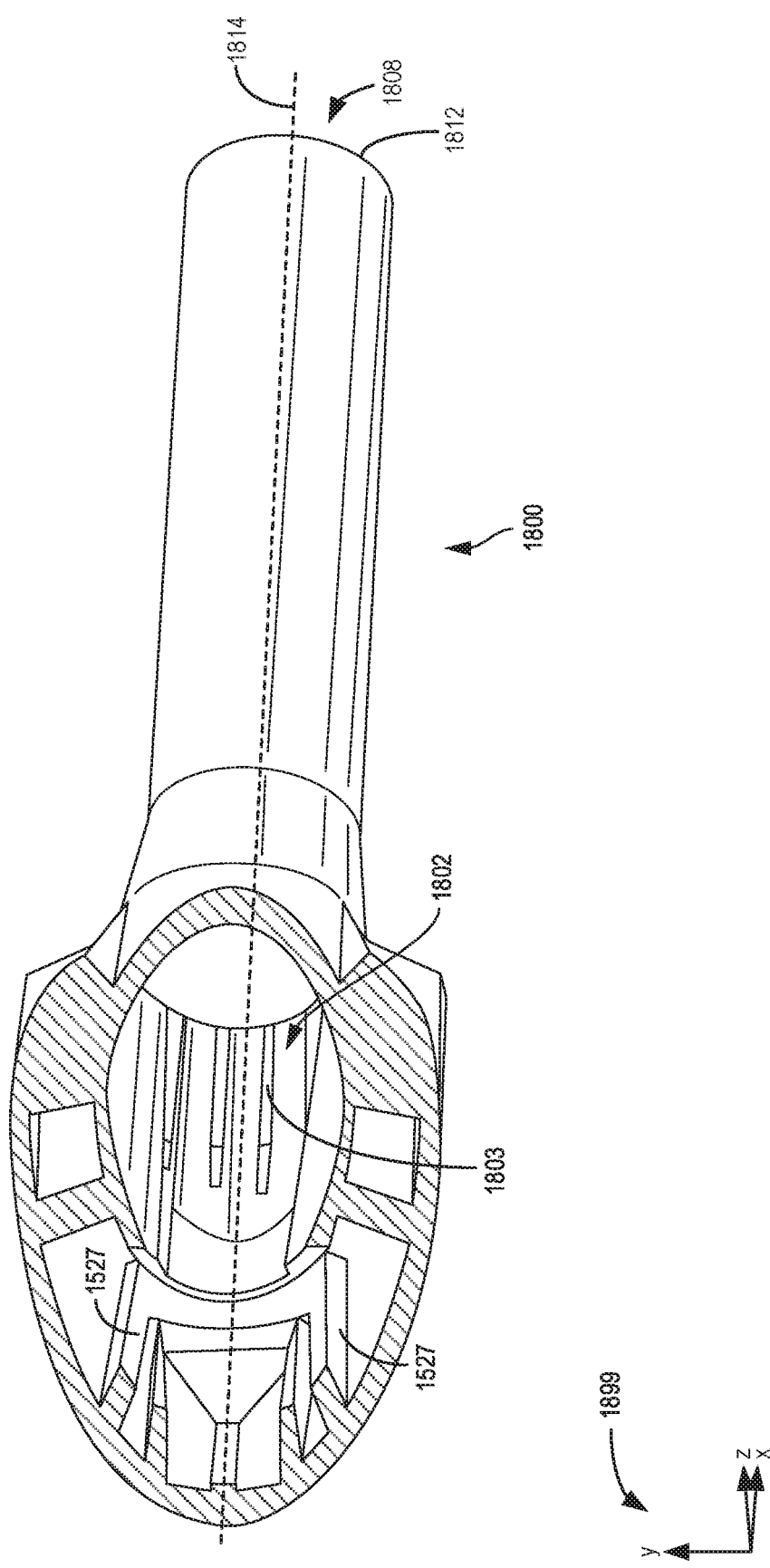
Figure 19:
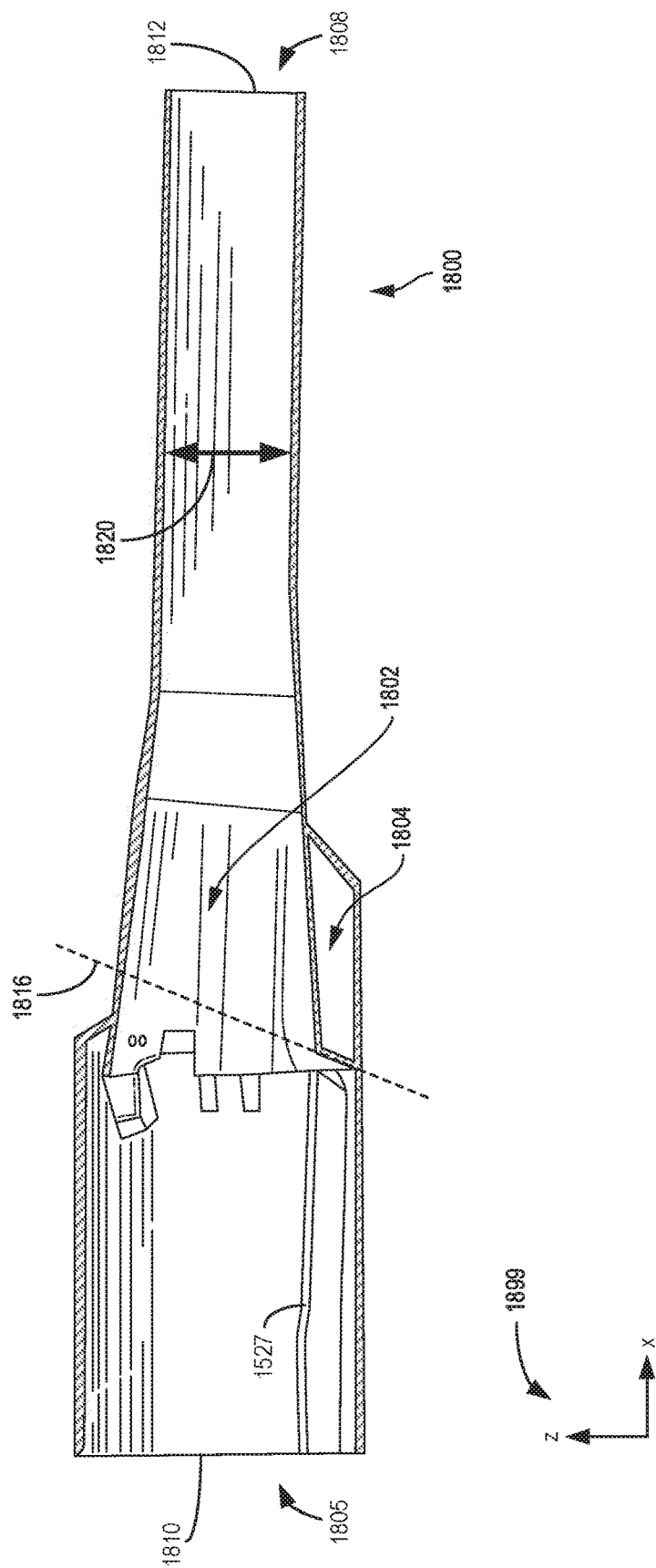

The present description is related systems for refueling via a fuel tank having a filler pipe in a motor vehicle. In one example, the vehicle may include a compression ignition engine and a diesel fuel system as shown in FIG. 1. The fuel system of FIG. 1 may include a refueling assembly, wherein an insert may be retained in a filler pipe during refueling. Additional views of the insert are provided in FIGS. 2-5. Specifically, FIGS. 2A and 2B show front and back perspective views of the first projection and aperture, FIGS. 3A and 3B show front and back perspective views of the second projection and aperture, and FIGS. 4A and 4B show front and back perspective views of the third projection and aperture. FIG. 5A shows a back perspective view of the insert and FIG. 5B shows a cross-sectional side view of the insert, with each of FIG. 5A and FIG. 5B showing the first projection, second projection, and third projection. In one example, the insert may be coupled to a funnel (as shown by FIGS. 6-7), with the funnel shaped to couple with the filler pipe of the refueling assembly. In some embodiments, such as the embodiment shown by FIGS. 2-7, the first projection, second projection, and third projection of the insert may be formed by a plurality of ribs. In other embodiments, such as the embodiment shown by FIGS. 8A-8B, or the embodiment shown by FIGS. 9A-9A, the first projection, second projection, and third projection may be formed by a plurality of annular extensions. The funnel and insert are shaped to couple with a variety of fuel nozzles including low-flow fuel nozzles and high-flow fuel nozzles, such as the fuel nozzles shown by FIG. 10. The insert is shaped to couple with the filler pipe of the refueling assembly, as shown by FIG. 11. A high-flow diesel nozzle or a low-flow diesel nozzle may be inserted into the insert in order to deliver fuel into the filler pipe, as shown by FIGS. 12A-12B. The projections of the insert are shaped to form a plurality of inner diameters of the insert, as shown by FIG. 13. The funnel includes a plurality of extensions shaped to retain a position of a fuel nozzle inserted into the fuel, as shown by FIG. 14. In some examples, the funnel may include a fluid reservoir and a fence with a plurality of apertures, as shown by FIGS. 15-17. In other examples, the funnel may include a fence with a plurality of slots, as shown by FIGS. 18-20.

Referring now to FIG. 1, a schematic depiction of a vehicle system 6 is shown. The vehicle system 6 includes an engine system 8 coupled to a fuel system 18. In some examples, vehicle system 6 may be a diesel vehicle. A surface on which the vehicle system 6 sits is depicted as ground surface 17.

The engine system 8 may include an engine 10 having a plurality of cylinders 30. Cylinders 30, or combustion chambers, may receive intake air from an intake manifold 44 via an intake passage 42 and may exhaust combustion gases via an exhaust manifold 48 to exhaust passage 35. The intake manifold 44 and the exhaust manifold 48 can selectively communicate with the cylinders 30 via intake valve (not shown) and exhaust valve (not shown), respectively. In some embodiments, cylinders 30 may include two or more intake valves and/or two or more exhaust valves.

The engine intake 23 includes a throttle 62 fluidly coupled to the engine intake manifold 44 via the intake passage 42. In one example, the position of the throttle 62 may be varied by a controller 12 via a signal provided to an electric motor or actuator included with the throttle 62, a configuration that is commonly referred to as electronic throttle control (ETC). In this manner, the throttle 62 may be operated to vary the intake air provided to the cylinders 30.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein. While only a single injector 66 is shown, additional injectors are provided for each cylinder. In this manner, fuel injector 66 provides what is known as direct injection of fuel into combustion chamber 30. Fuel may be delivered to fuel injector 66 by a fuel system 18 including a fuel tank, a fuel pump, and a fuel rail, discussed below.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump 21. The fuel pump 21 may include one or more pumps for pressurizing fuel delivered to the injectors of engine 10, such as the example injector 66 shown. It will be appreciated that fuel system 18 may be a return-less fuel system, a return fuel system, or various other types of fuel system. Fuel tank 20 may hold diesel fuel. In other embodiments, fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Further, a fuel filler system, herein also termed a refueling assembly 19 may be provided. In some examples, fuel filler system may be coupled to fuel tank 20 via a fuel fill line 11. Refueling assembly 19 may include a mouth 24 and one or more doors (not shown) within the refueling assembly 19. The one or more doors may provide a return force to the door when opened. For example, the one or more doors may be configured to provide a return force when one or more doors are depressed via a fuel nozzle. Further, the one or more doors may close after a fuel nozzle is removed during a refueling event. Thus, the one or more doors may automatically close without assistance from a refueling operator.

Refueling assembly 19 may include a filler pipe 26, wherein filler pipe 26 comprises an inner circumference 28 (which may herein be referred to as inner perimeter 28). Filler pipe 26 is in fluidic communication with fuel tank 20 via fuel fill line 11, as shown in FIG. 1. Refueling assembly 19 may further include a flow guide (not shown) which is arranged downstream of one or more doors. The flow guide may be at least partially enclosed by filler pipe 26. The refueling assembly 19 is configured such that a fuel-dispensing nozzle (not shown) may be inserted into the filler pipe 26 to refuel fuel tank 20.

Further, refueling assembly 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. Refueling assembly 19 may also include a fuel cap 105 for sealing off the fuel filler system from the atmosphere.

Controller 12 may comprise a portion of a control system 14. As such, controller 12 may be a microcomputer, including a microprocessor unit (not shown), input/output ports (not shown), an electronic storage medium for executable programs and calibrations values as a read only memory chip (not shown), random access memory (not shown), keep alive memory (not shown), and a data bus. Control system 14 is shown receiving information from a plurality of sensors 16 and sending control signals to a plurality of actuators 81. The controller may receive input data from the various sensors, process the input data, and trigger the actuators in response to the processed input data based on instruction or code programmed therein corresponding to one or more routines. As one example, sensors 16 may include exhaust gas sensor 37 located upstream of the emission control device, and temperature sensor 33. Other sensors such as pressure, temperature, air/fuel ratio, and composition sensors may be coupled to various locations in the vehicle system 6. As another example, the actuators may include fuel injector 66, throttle 62, pump 21, and refueling lock 45.

Turning now to FIG. 2A, an insert 300 may be provided in the filler pipe 26 in order to more effectively and efficiently delivery fuel to the fuel tank 20 to a desired level via the refueling assembly 19. Specifically, FIG. 2A shows a first perspective view (front perspective view) of the insert 300, while FIG. 2B illustrates a second perspective view (back perspective view) perceived from an opposite side of the first perspective view. Insert 300 may be inserted and retained in a fixed position within the filler pipe 26 through mouth 24 of the refueling assembly 19, wherein the filler refueling inlet and/or filler pipe 26 may envelop the insert 300 and/or a refueling structure (discussed below in reference to FIGS. 6 to 7) securely and firmly within filler pipe 26. In some examples, the insert 300 and/or the refueling structure may open one or more doors during the refueling event. As such, the insert 300 and/or the refueling structure may allow an unrestrictive path, wherein fuel may travel quickly and efficiently to fill fuel tank 20 to a desired level.

Insert 300 includes a first end 301 and a second end 303, wherein first end 301 may include an inlet 380. The first end 301 is positioned opposite to the second end 303 in a direction along a central axis 305 of the insert 300. Further, second end 303 may include an outlet 390. Each of the inlet 380 and outlet 390 of insert 300 may include and define a central opening 320 of insert 300. The aforementioned inlet 380, outlet 390, and central opening 320 provides a flow path for the fuel during the refueling event. In FIG. 2A, first end 301 may be an end proximate a refueling nozzle (not shown) and the mouth 24 (e.g., an outer end of the filler pipe) of the refueling assembly 19 when insert 300 is positioned in filler pipe 26. On the other hand, the second end 303 may be proximate the fuel tank 20 when insert 300 is positioned in the filler pipe 26.

An outer surface 304 of insert 300 may have an exterior circumference 360. As such, the outer surface 304 may be securely coupled to inner circumference 28 of filler pipe 26 of refueling assembly 19. In another example, the outer surface 304 may be coupled to an inner circumference (e.g., inner perimeter) of another structure, such as a funnel, as will be discussed below in reference to FIGS. 6 to 7. As such, exterior circumference 360 of insert 300 may be smaller than the inner circumference 28 of the filler pipe 26 and/or the funnel, for example. In another embodiment, insert 300 may be operably coupled to mouth 24 and/or another component of refueling assembly 19. In yet another embodiment, exterior circumference 360 of insert 300 may have threads, which may be enable threading of the insert into a filler pipe having complementary threads.

In some embodiments, insert 300 may be substantially cylindrical in shape having central opening 320. However, in some examples, insert 300 may taper at an end, such as an end proximate the fuel tank 20 (e.g., second end 303) when insert 300 is positioned in the filler pipe 26. In other examples, insert 300 may taper an opposite end (e.g., first end 301), such as an end proximate the refueling nozzle and the mouth 24 of the refueling assembly 19 when insert 300 is positioned in filler pipe 26. Further, an axial extent, or an axial length, of the insert 300 may not be uniform along a circumference at the second end 303 of the insert 300 due to the presence of the plurality of ribs or other projections, as described below.

The insert 300 may be provided with a plurality of ribs, or rib patterns, thereby enabling nozzles of various sizes and shapes, including high flow and low flow diesel nozzles, to be inserted into filler pipe 26 in a desired orientation. In one example, the insert 300 includes a first projection 306 that may be formed by a plurality of ribs or rib patterns. In alternate embodiments, insert 300 may be provided with a plurality of bumps, beads, rings, axial ribs, radial ribs, orthogonal ribs, and/or cones arranged at similar positions as the first projection 306 and extending in a direction toward the central axis 305 (e.g., in a direction radially inward relative to an inner surface 302 of the insert 300) to reduce restrictions and risk for flow back, and retain structural durability.

For reference, a low-flow diesel nozzle is defined as a nozzle with flow rates lower than 12 gallons-per-minute, and with an outlet diameter greater than 23.6 millimeters but less than 24.5 millimeters. A high-flow diesel nozzle is defined as a nozzle with a flow rate of less than 27 gallons-per-minute, and with an outlet diameter greater than 30 millimeters but less than 37 millimeters. As such, properties of the insert as described below may be described with respect to one or both of a low-flow diesel nozzle and a high-flow diesel nozzle. In other words, components of the insert (e.g., projections, apertures, etc., as described below) may be configured to accommodate (e.g., couple with) a low-flow diesel nozzle and/or a high-flow diesel nozzle, as defined above.

Insert 300 includes the inner surface 302 having an interior circumference 330. In one example, first projection 306 may include a plurality of axial ramp ribs 312 spanning a first axial length of the inner surface 302. In some embodiments, the insert may include a second projection 400 including a plurality of constraint ribs 402 spanning a second axial length, and/or a third projection 500 including one or more stop ribs (such as stop ribs 502, 506, 512, 520, 522, and 524, shown by FIGS. 4A-4B) spanning a third axial length. The second projection 400 and third projection 500 each extend in a direction toward the central axis 305 (e.g., in a direction radially inward relative to an inner surface 302 of the insert 300). In one example, the second projection 400 is positioned between the first projection 306 and the third projection 500 in a direction parallel to the central axis 305. The first projection 306 and third projection 500 may each couple to the insert 300 at a location vertically below the central axis 305 relative to a surface on which the vehicle (e.g., vehicle system 6 and ground surface 17) sits, while the second projection 400 may couple to the insert 300 at a location vertically above the central axis 305. In this way, insert 300 may assist in positioning and securely engaging the nozzle with the filler pipe 26 during a refueling event, for example. In alternate embodiments, the second projection and third projection may be formed by a plurality of bumps, beads, rings, axial ribs, radial ribs, orthogonal ribs, and/or cones.

In an example, insert 300 may be manufactured by injection molding using one or more plastic materials. For example, nylon may be used to fabricate insert 300. In another example, another inexpensive plastic, elastomeric, or plastic-like material may be used to manufacture insert 300. In alternative examples, a metal, such as aluminum, may be used to manufacture the insert 300 in the filler pipe 26. As a result, welding may be used in these instances to hold the insert 300 in the filler pipe 26. As yet another example, insert 300 may be manufactured with a combination of two or more of the materials described above.

FIG. 2A shows a first perspective view (e.g., front perspective view with inlet 380 in a forward-facing view) of the insert 300 including a first end 301 and a second end 303. The central axis 305 of insert 300 spans through central opening 320 along a longitudinal length of the insert 300. In an embodiment, the first end 301 may be an end of the insert 300 proximate the refueling nozzle and mouth 24 of refueling assembly 19 during a refueling event. For example, the first end 301 may partially or substantially coincide with an inlet of the filler pipe 26, such as mouth 24 of refueling assembly 19. On the other hand, the second end 303 may be at an end of the insert 300 proximate the fuel tank 20 during a refueling event utilizing insert 300.

In the depicted embodiment, the first end 301 may be flat along a radial plane of inlet 380 of insert 380, the radial plane being substantially perpendicular to the central axis 305 across a radius of insert 300. In contrast, the second end 303 may include various protrusions extending away from second end 303 of insert 300. As such, the axial extent, or axial length, of the insert 300 may not be uniform along a circumference at the second end 303 of the insert 300. In particular, the second projection 400 and/or third projection 500 may extend in an axial and/or radial direction such that second end 303 may include an uneven surface.

Figure 9A:
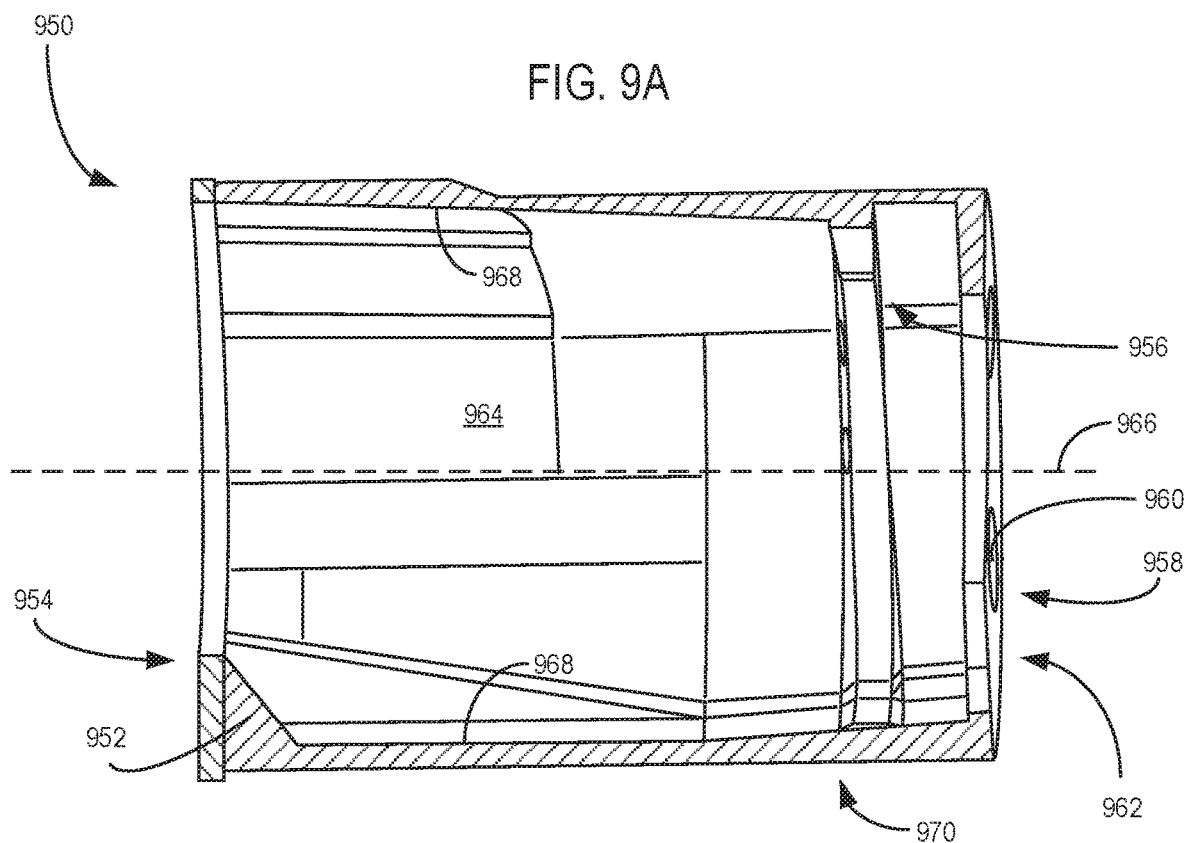
FIGS. 9A-9B show a cross-sectional view and a perspective view of a third embodiment of an insert for a filler pipe.
Figure 9B:
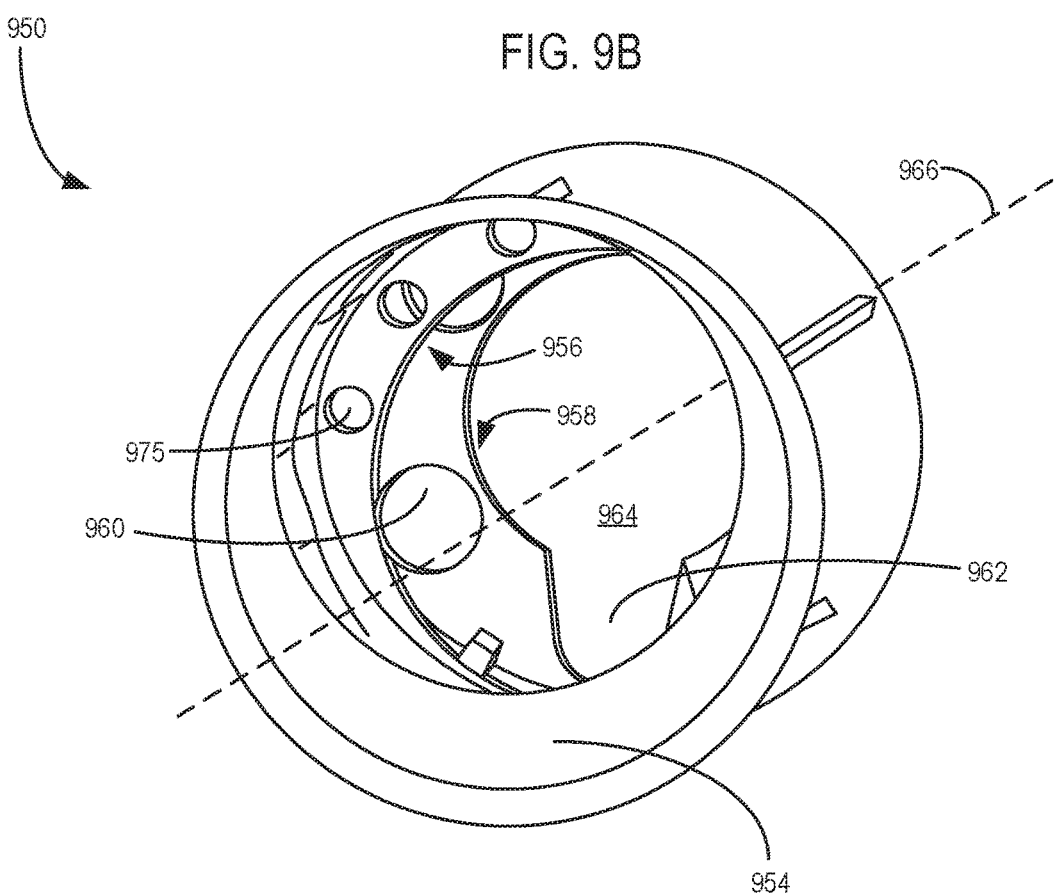
Figure 10:
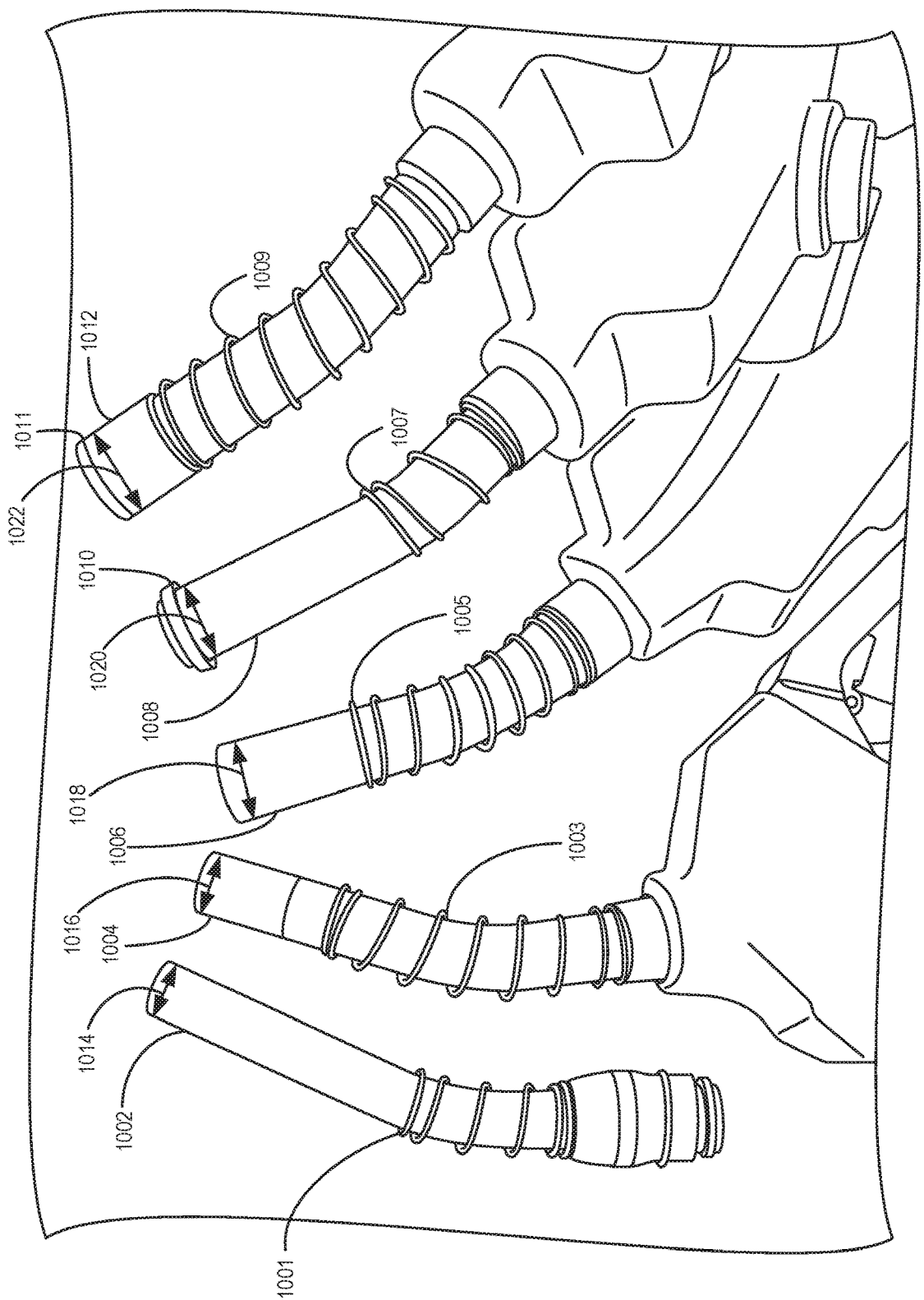
FIG. 10 shows a variety of fuel nozzles that may couple with either of an insert for a filler pipe, or with the example funnel.
Figure 11:
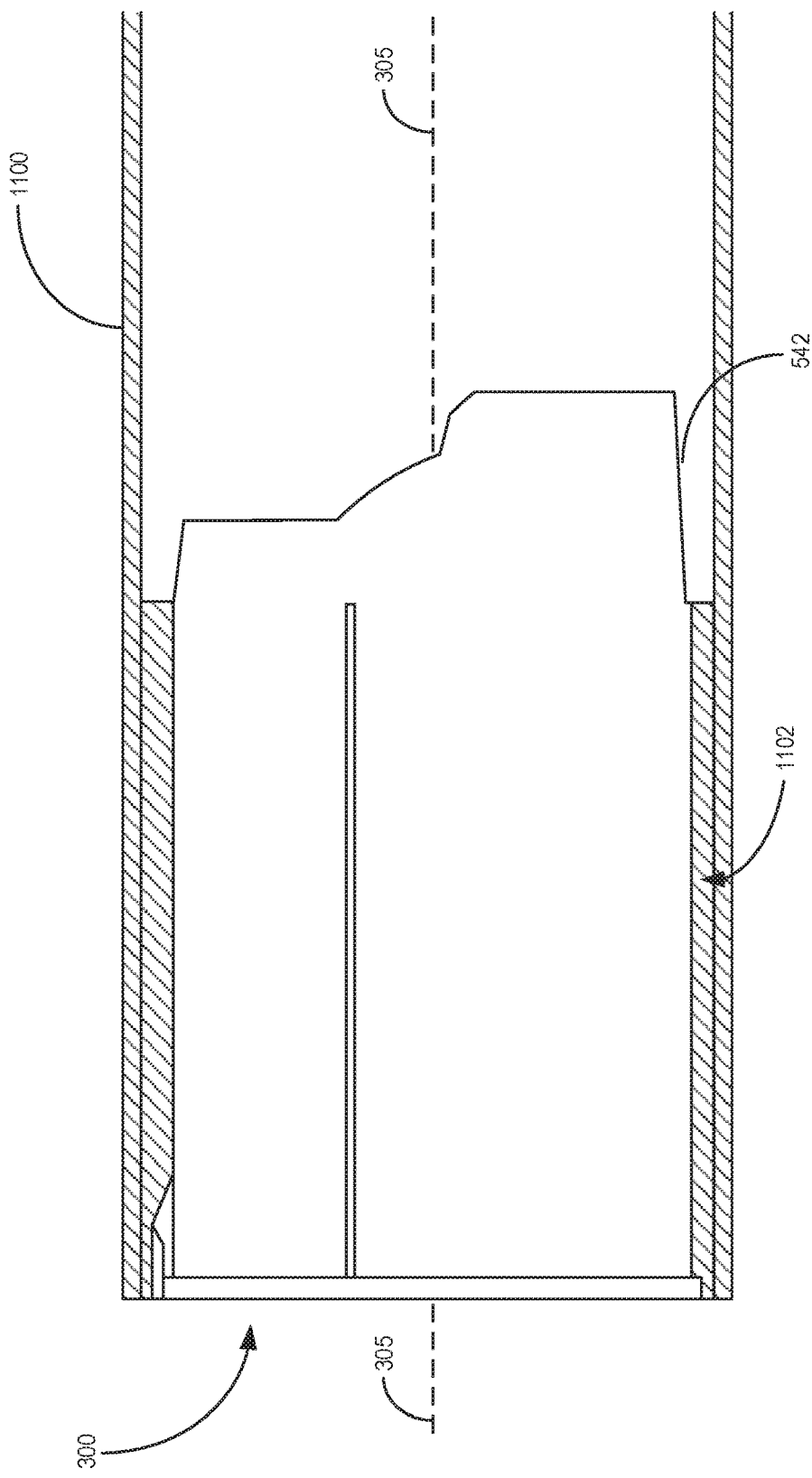
FIG. 11 shows the first embodiment of the insert coupled with a filler pipe.

Turning momentarily to FIG. 10, a variety of diesel fuel nozzles are shown. Each nozzle includes an outer diameter. For example, first nozzle 1002 has outer diameter 1014, second nozzle 1004 has outer diameter 1016, third nozzle 1006 has outer diameter 1018, fourth nozzle 1008 has outer diameter 1020, and fifth nozzle 1012 has outer diameter 1022. As illustrated, fourth nozzle 1008 and fifth nozzle 1012 are high-flow nozzles (as defined above), having a larger diameter than the first nozzle 1002, second nozzle 1004, and third nozzle 1006 to increase a flow of fuel from the nozzles. Each of the fourth nozzle 1008 and fifth nozzle 1012 are shown to include a nozzle retaining ring (such as nozzle retaining ring 1010 of fourth nozzle 1008, and nozzle retaining ring 1011 of fifth nozzle 1012), which increases the outer diameter at the end of each nozzle and may increase an ability of each nozzle to couple with the insert (e.g., the inserts shown by FIGS. 2-9 and FIGS. 11-14). The first nozzle 1002, second nozzle 1004, and third nozzle 1006 are each low-flow nozzles with relatively lower flow rates than the fourth nozzle 1008 or fifth nozzle 1012. As shown, each of the nozzles may include a nozzle spring, such as first nozzle spring 1001 coupled to first nozzle 1002, second nozzle spring 1003 coupled to second nozzle 1004, third nozzle spring 1005 coupled to third nozzle 1006, fourth nozzle spring 1007 coupled to fourth nozzle 1008, and fifth nozzle spring 1009 coupled to fifth nozzle 1012. Each nozzle spring extends along a length of its corresponding coupled nozzle.

Now referring back to FIG. 2A, in one embodiment, the first projection 306 may be at least partially arranged at first end 301. In particular, first projection 306 may be positioned on inner surface 302 of insert 300 at first end 301 of the insert 300. In one example, the first projection 306 may comprise an anchor rib 308 arranged perpendicular to central axis 305 of the filler pipe 26. The anchor rib 308 may be positioned perpendicular to central axis 305 such that a flat surface 322 of anchor rib 308 faces towards the refueling nozzle and away from the fuel tank 20. In one example, the anchor rib 308 may be crescent-shaped. In another example, the anchor rib 308 may be crescent-shaped with one or more breaks 310 that cuts or chops the anchor rib 308 into one or more anchor rib pieces. As shown in FIGS. 2A and 2B, for example, anchor rib pieces 314, 316, and 318 may be formed from anchor rib 308 by two breaks 310, with each break forming an aperture 311. Although two breaks 310 are depicted in FIGS. 2A and 2B, it will be appreciated that any number of breaks (and any number of apertures formed by the breaks) may be included as a component of the anchor rib 308. For example, only one break may be present, forming two anchor rib pieces. In another example, three to four breaks 310 may be included in anchor rib 308, forming a plurality of anchor rib pieces. As such, each of the breaks 310 provides an aperture in the first projection 306. As shown in FIG. 5B, the first projection 306 includes an upstanding portion 307 with a height 309 (e.g., a length extending in a radial direction relative to the central axis 305) that can be used to retain a fuel nozzle. In particular, the upstanding portion 307 may bear against a nozzle spring (such as any of the nozzle springs 1001, 1003, 1005, 1007, or 1009 as described above) to keep the fuel nozzle from decoupling from the insert if an operator (e.g., a user of a vehicle including the insert) does not hold the fuel nozzle in contact with the insert.

In one embodiment, the first projection 306 further comprises a plurality of ramp ribs 312. The anchor rib 308 may be operably coupled to the plurality of ramp ribs 312, each ramp rib 312 extending from the anchor rib 308 at the first end 301 towards the second end 303 of insert 300 along an axis substantially parallel to central axis 305. In the depicted embodiment of FIGS. 2A and 2B, the plurality of ramp ribs 312 may be coupled to anchor rib pieces 314, 316, and 318. In this example, one ramp rib 312 is coupled to each anchor rib piece 314 and anchor rib piece 316, while three ramp ribs 312 are coupled to anchor rib piece 316. The ramp ribs 312 provide structure to the anchor ribs 308 while reducing a likelihood of fuel flow restriction or air flow restriction through the insert, and also reduce a likelihood of obstruction of a fuel nozzle from being inserted into the insert. Additionally, the ramp ribs provide support for a fuel nozzle inserted into the insert by retaining the fuel nozzle in a position advantageous for fuel to flow from the fuel nozzle and into a filler pipe coupled with the insert.

In addition, the plurality of ramp ribs 312 may vary in a longitudinal length extending from the anchor rib 308 at the first end 301 towards the second end 303 of insert 300 along an axis substantially parallel to central axis 305. For example, in FIGS. 2A and 2B, ramp ribs 312 coupled to anchor rib piece 316 may vary in longitudinal length along the inner surface 302 of insert 300, with an outer ramp ribs (e.g., away from central axis 305) coupled to anchor rib piece 316 being longer in longitudinal length than an inner ramp rib (e.g., towards central axis 305) coupled to anchor rib piece 316 along the inner surface of insert 300. In contrast, ramp ribs 312 coupled to anchor rib pieces 314 and 318 may be substantially similar in longitudinal length along the inner surface of insert 300, wherein the aforementioned longitudinal length may span approximately an entire length of the insert 300. In this example, the inner ramp rib 312 coupled to anchor rib pieces 316 may extend approximately 50%, or substantially half, of a longitudinal length of insert 300, while outer ramp ribs 312 coupled to anchor rib piece 316 may span substantially an entire longitudinal length of insert 300. In another example, inner ramp ribs 312 coupled to anchor rib pieces 316 may extend approximately 30% of a longitudinal length of insert 300, while outer ramp ribs 312 coupled to anchor rib pieces 314 and 318, and ramp ribs 312 coupled to anchor rib pieces 314 and 318 may span substantially 75% of the longitudinal length of insert 300. In yet another example, inner ramp ribs 312 coupled to anchor rib pieces 316 may extend approximately 60% of a longitudinal length of insert 300, while outer ramp ribs 312 coupled to anchor rib pieces 314 and 318, and ramp ribs 312 coupled to anchor rib pieces 314 and 318 may span substantially 90% of the longitudinal length of insert 300.

Further, one or more ramp ribs 312 may be in touching contact with one or more adjacent ramp ribs 312. In one example, a first ramp rib 312 may be in touching contact with a second, adjacent ramp rib 312 at the second end 303 for a desired length of each of said ramp ribs 312 parallel to central axis 305. In another example, the first ramp rib 312 may be in touching contact with the second, adjacent ramp rib 312 at the first end 301 for a desired length of each of said ramp ribs 312 parallel to central axis 305. The length of touching contact for one or more ramp ribs 312 coupled to the anchor rib 308 may vary depending on the desired orientation and guidance provided to various nozzles and/or fuel sources.

In one embodiment, the plurality of ramp ribs 312 may vary in height (e.g., a radial height across a radius of central opening 320 perpendicular to the central axis 305) along the longitudinal length of the insert 300, e.g., along an axis substantially parallel to central axis 305. For example, as depicted in FIG. 2A, ramp rib 312 may have a greater radial height at a location in touching contact with the anchor rib 308 adjacent to the first end 301 than at a location adjacent to the second end 303. In some embodiments, ramp rib 312 may slope gradually and/or abruptly as ramp rib 312 extends towards the second end 303 of insert 300. Thus, at a location adjacent or coinciding with second end 303 of insert 300, ramp rib 312 may have a lower radial height than at a location adjacent or coinciding first end 301. In other embodiments, ramp rib 312 may slope gradually and/or abruptly in a first direction (e.g., increasing in radial height) and/or in a second direction (e.g., decreasing in radial height) at various intervals as ramp rib 312 extends towards the second end 303 of insert 300. For example, as shown in FIG. 2B, one or more of the ramp rib 312 coupled to the anchor rib piece 316 slopes gradually in the second direction, and then slopes abruptly or sharply in the second direction.

Although the aforementioned longitudinal length configurations and/or radial height configurations of each ramp rib 312 are described as depicted in FIGS. 2A and 2B, it will be appreciated that various alternative longitudinal lengths and radial heights of each ramp rib 312 may be appreciated.

As a result of the described configurations of the first projection 306, insert 300 may provide a smooth guide to the nozzle for sliding in and out of the filler pipe. Further, the ramp ribs, in particular, may guide and control the flow of fuel, such as diesel fuel, into the fuel tank 20 such that the nozzle shuts off at a desired time. In particular, the first projection 306 enables formation of a fluid dam to collect fuel for nozzle shut off when using a high flow fuel nozzle, thereby preventing spill back and well back. The first projection 306 also enables the refueling nozzle to be positioned at a desired depth within the filler pipe 26. In these ways, the first projection 306 allows effective and stable delivery of a fuel during a refueling event.

Turning now to FIG. 3A, a first perspective view (e.g., front perspective view) of the insert 300 (FIG. 3A) and a second perspective view (e.g., back perspective view) of insert 300 (FIG. 3B) are shown, the insert 300 further including a second projection 400. In one embodiment, the second projection 400 may be positioned on the inner surface 302 of the insert 300, wherein the second projection 400 may extend from the second end 303 proximate a fuel tank 20 of the vehicle to a medial area 401 of the insert 300. In one example, the medial area 401 may be an area of the insert 300 approximately in the middle or center of the insert 300 along central axis 305. In alternative embodiments, second projection 400 may include a plurality of bumps, beads, rings, and/or cones arranged at similar positions as said ribs.

In one embodiment, the second projection 400 may be positioned at an opposite side along the inner surface 302 of the insert's interior circumference 330 relative to the first projection 306. In other words, the second projection 400 may be arranged approximately 180 degrees around the interior circumference 330 of the insert 300 at least partially at or adjacent to the second end 303. Said another way, if the insert was viewed analogously to a clock, first projection may be positioned at 6 o'clock, while the second projection may be positioned at 12 o'clock.

A first portion 408 of the second projection 400 may be coupled to at least a portion of the second end 303, while a second portion 410 of the second projection 400 may be coupled to at least a portion of the medial area 401. In one example, the first portion 408 of the second projection 400 may be extend a distance beyond the second end 303 along an axis substantially parallel to central axis 305 in a direction opposite the first projection 306, as shown by FIG. 5B.

As such, each rib of the second projection 400 may extend in an axial direction along central axis 305 towards the medial area 401 of insert 300. In another embodiment, the second projection 400 may extend along the interior circumference 330 of the insert 300 a distance substantially less than a distance to the medial area 401. In yet another embodiment, the second projection 400 may extend a distance substantially greater than a distance from at or beyond second end 303 to the medial area 401, e.g., a distance from at or beyond the second end 303 to a location partially or substantially adjacent to or at the first end 301 when the insert 300 is positioned in the filler pipe 26 during a refueling event.

In some instances, the second projection 400 may be arranged approximately 150 degrees around the interior circumference 330 of the insert 300 relative to the first projection 306 at or adjacent to the second end 303 or the first end 301. In other instances, the second projection 400 may be arranged approximately 210 degrees relative to the first projection 306 around the interior circumference of the insert 300 at or adjacent to the second end 303 or first end 301. In each instance, the second projection 400 may extend towards the medial area 401 from the first end 301 or second end 303 of insert 300.

Second projection 400 may comprise a plurality of constraint ribs 402 connected to one another via a connector rib 404. Each of the constraint ribs 402 may include said first portion 408 positioned substantially at or adjacent to the second end 303 and said second portion 410 positioned substantially at or adjacent to the medial area 401 on the inner surface 302 of insert 300. In one example, as depicted in FIGS. 3A and 3B, the plurality of constraint ribs 402 may include five ribs. In another example, the plurality of constraint ribs 402 may include six ribs. In yet another example, the plurality of constraint ribs 402 may comprise three ribs. It will be appreciated that any number of constraint ribs 402 may be included in the plurality of constraint ribs 402, as desired.

The plurality of constraint ribs 402 may be arranged substantially parallel to the central axis 305 of the filler pipe 26. Further, each constraint rib 402 may be spaced at a pre-determined distance from an adjacent constraint rib 402, such that the plurality of constraint ribs 402 may be arranged at evenly spaced intervals along the inner surface 302 of insert 300. However, in other examples, the plurality of constraint ribs 402 may be positioned at unevenly and/or evenly spaced intervals such that a distance between adjacent constraint ribs 402 may vary.

In one embodiment, as shown in FIGS. 3A, 3B, and below in FIG. 4B, each constraint rib 402 may vary in height (e.g., a radial height across a radius of central opening 320 perpendicular to the central axis 305) along the longitudinal length of the insert 300, e.g., along an axis substantially parallel to central axis 305. For example, in the depicted embodiment, as each constraint rib 402 extends towards the medial area 401 from adjacent to the second end 303 of the insert 300, each constraint rib 402 may slope gradually and/or sharply in the first direction (e.g., increasing in radial height) along the longitudinal length of the insert 300, and then may slope gradually and/or sharply in the second direction (e.g., decreasing in radial height). Thus, at a location adjacent to or coinciding with medial area 401 of insert 300, constraint rib 402 may be at a similar radial height as at a location adjacent to or coinciding with second end 303. In other embodiments, each constraint rib 402 may slope gradually and/or abruptly in the first direction (e.g., increasing in radial height) and/or in the second direction (e.g., decreasing in radial height) at various intervals as each constraint rib extends towards the medial area 401 of insert 300.

In the depicted embodiment, each constraint rib 402 may be spaced a distance 420 from an adjacent constraint rib 402, with each constraint rib forming an aperture. In one example, the plurality of constraint ribs 402 may be spaced evenly from one another, such that the distances between each constraint rib 402 is substantially the same. In other examples, the plurality of constraint ribs 402 may be spaced unevenly from one another, such that the distances between each constraint rib 402 is substantially the different.

As shown in FIGS. 3A and 3B, in an embodiment, the second projection 400 may further include a connector rib 404 connecting the plurality of constraint ribs 402. The connector rib 404 may traverse and be securely and irreversibly coupled to each constraint rib 402 at a connection point 406 of each constraint rib 402. As a result, the connector rib 404 may be positioned perpendicular to the plurality of constraint ribs 402 and the central axis 305. In one example, the connector rib 404 may be crescent-shaped. Although only one connector rib 404 is shown in FIGS. 3A and 3B, it will be appreciated that any number of connector ribs 404 may be included in the plurality of constraint ribs 402, as desired. In alternative embodiments, no connector rib 404 may be present to couple the plurality of constraint ribs 402. In this way, the connector rib 404 coupled to each of the constraint ribs 402 may act to strengthen the second projection 400. Further, the connector rib 404 coupled to each constraint rib 402 may be formed from molding, such as injection molding of a plastic material.

In one example, the connection point 406 may be a point on each constraint rib 402 at which each constraint rib 402 reaches a greater radial height as each constraint rib 402 extends from at or adjacent to the second end 303 to the medial area 401. In another example, the connection point 406 may be a point on each constraint rib 402 at which each constraint rib 402 begins to slope in the second direction (e.g., decreasing radial height) towards the medial area 401 and/or the second end 303. In other examples, the connection point 406 may be any location wherein one or more constraint ribs 402 are coupled to the connector rib 404.

In this way, the plurality of constraint ribs 402 connected via the connector rib 404 of insert 300 may guide the nozzle to a desired position and orientation, while providing a constraining force on the nozzle to reduce movement towards the fuel tank 20. Second projection 400 may also provide a latching anchor for nozzles when a retention spring or barb is located on a frontal surface of the nozzle. As a result, excess fuel delivered may not spill out of the filler pipe, and premature shut-off may be avoided.

Turning now to FIG. 4A, a front perspective view (FIG. 4A) and back perspective view (FIG. 4B) of the insert 300 are shown, the insert 300 further including a third projection 500. In one embodiment, the third projection 500 may be positioned on the inner surface 302 of the insert 300, wherein the third projection 500 may extend from the second end 303 proximate fuel tank 20 of the vehicle to an extended area 501 of the insert 300, as shown more clearly in FIG. 4B. As one example, the extended area 501 of insert 300 may be a portion of insert 300 located beyond the second end 303 in a direction opposite the first end 301. In one embodiment, the third projection 500 may not extend from the second end 303 to the extended area 501, but may instead be arranged substantially at the second end 303. In alternative embodiments, third projection 500 may include a plurality of bumps, beads, rings, and/or cones arranged at similar positions as said ribs.

In one embodiment, the third projection 500 may be positioned at least partially on a similar axial side along the inner surface 302 of the insert's interior circumference 330 as the first projection 306. In other words, if the insert was viewed analogously to a clock, first projection may be positioned at 6 o'clock, while the third projection 500 may be positioned at 3 o'clock and 9 o'clock.

However, in contrast to the first projection 306, the third projection 500 may be arranged around the interior circumference of the insert 300 at least partially at or adjacent to the second end 303 proximate to the fuel tank 20. Said another way, a first part 516 of the third projection 500 may be coupled to at least a portion of the second end 303, while a second part 518 of the third projection 500 may be coupled to at least a portion of the extended area 501. As such, each stop rib 506 of the third projection 500 may extend from a location adjacent to or at the second end 303 in an axial direction along central axis 305 towards the extended area 501 of insert 300. In another embodiment, the third projection 500 may extend along the interior circumference 330 of the insert 300 a distance substantially less than a distance to the extended area 501. In yet another embodiment, the third projection 500 may extend a distance substantially greater than a distance from the second end 303 to the extended area 501, e.g., a distance from second end 303 to a location in greater proximity to the fuel tank 20 and farther from the refueling nozzle when the insert 300 is positioned in the filler pipe 26 during a refueling event.

Third projection 500 may comprise one or more sets of stop ribs 506, wherein each stop rib 506 may be connected to one another via a bridge 504. Each of the stop ribs 506 may include said first part 516 positioned at or adjacent to the second end 303 extending to said second part 518 positioned at or adjacent to the extended area 501 on the inner surface 302 of insert 300.

In one example, as depicted in FIGS. 4A and 4B, third projection 500 may comprise a first set of stop ribs 502 and a second set of stop ribs 512. The first set of stop ribs 502 may be positioned at a spaced distance 540 from the second set of stop ribs 512, creating an aperture 542 positioned adjacent to the third projection 500. In other words, the aperture 542 is formed by both of the inner surface 302 and the third projection 500. In another example, only a single set of stop ribs may be provided. In yet another example, the third projection 500 may include three or more sets of stop ribs 506, such that the three or more sets are spaced at a desired distance from an adjacent set of stop ribs 506. It will be appreciated that any number of sets of stop ribs 506 may be included, as desired. In some instances, no sets of stop ribs 506 may be provided. Further, the distance 540 between adjacent sets of stop ribs (e.g., a distance between the first set of stop ribs 502 and second set of stop ribs 512) may be based on a desired orientation of various nozzles coupled to the filler pipe 26 via insert 300. In one example, the aperture 542 may be shaped to accommodate an aspirator of a fuel nozzle, such as shutoff aspirator 1204 shown by FIG. 12 and described below. In addition, the aperture 542 may reduce an amount of flow restriction of fluid (e.g., fuel) flowing from a fuel nozzle.

As mentioned earlier, the first set of stop ribs 502 and the second set of stop ribs 512 may each include one or more stop ribs 506 connected together via the bridge 504. In one example, each of the first set of stop ribs 502 and the second set of stop ribs 512 comprises three stop ribs 506, as shown in FIGS. 4A and 4B. In another example, each of the first set of stop ribs 502 and the second set of stop ribs 512 may comprise three stop ribs 506. It will be appreciated that any number of stop ribs 506 may be included in each set of stop ribs 506, as desired.

In one embodiment, the first set of stop ribs 502 and second set of stop ribs 512 are arranged substantially parallel to the central axis 305 of the filler pipe 26. Further, each stop rib 506 may be spaced at pre-determined distance(s) from an adjacent stop rib 506. In the depicted embodiment, a first stop rib 520 of each of the first set of stop ribs 502 and second set of stop ribs 512 may be spaced at a first distance 530 from an adjacent second stop rib 522, creating an aperture 531. A third stop rib 524 may be positioned at a second distance 532 from the second stop rib 522 on a side opposite the first stop rib 520, creating an aperture 534. In one example, the first distance 530 may be less than the second distance 532, as shown in FIGS. 4A and 4B. In another example, the first distance 530 may be substantially the same as the second distance 532. In yet another example, the first distance 530 may be greater than the second distance 532. As such, the plurality of constraint ribs 402 may be arranged at desired (e.g., unevenly and/or evenly spaced intervals) along the inner surface 302 of insert 300.

In one embodiment, as shown in FIGS. 4A, 4B, and below in FIG. 5B, each stop rib 506 may slope to a desired height (e.g., a radial height across a radius of central opening 320 perpendicular to the central axis 305) along the longitudinal length of the insert 300, e.g., along an axis substantially parallel to central axis 305. For example, as depicted in FIGS. 4A and 4B, each stop rib 506 may have a greater radial height at a location substantially adjacent to or at the second end 303 of the insert 300 (e.g., first part 516) as compared to the second part 518 of the third projection 500 positioned at or adjacent to the extended area 501. In other words, each stop rib 506 may have greater radial height along the second end 303 as compared to the extended area 501 of insert 300.

In the depicted embodiment, as each stop rib 506 extends towards the second end 303 from the extended area 501 of the insert 300, each stop rib 506 may slope gradually and/or abruptly in the second direction (e.g., decreasing in radial height). Thus, at a location adjacent to or coinciding with extended area 501 of insert 300, each stop rib 506 may be at a greater radial height than at a location adjacent to or at second end 303. In other embodiments, one or more of the stop ribs 506 may slope gradually and/or abruptly in the first direction (e.g., increasing in radial height) and/or in the second direction (e.g., decreasing in radial height) at various intervals as each stop rib 506 extends towards the extended area 501 of insert 300.

As shown in the embodiment of FIGS. 4A and 4B, the third projection 500 may further include bridges 504, wherein bridges 504 may connect one or more stop ribs 506 within each of the first set of stop ribs 502 and the second set of stop ribs 512. Each bridge 504 may traverse and be securely and irreversibly coupled to each stop rib 506 at a connection point 510 of each stop rib 506. In one example, the connection point 510 may be at a location of increased radial height of each stop rib 506. In another example, the connection point 510 may be another location of each stop rib 506. As a result, the bridge 504 may be positioned perpendicular to the plurality of stop ribs 506, as well as positioned substantially perpendicular to the central axis 305. In one example, the bridge 504 may be crescent-shaped. In another example, the bridge 504 may comprise another shape, such as a straight line.

Although two bridges 504 are shown in FIGS. 4A and 4B (e.g., a bridge for each of the first set of stop ribs 502 and the second set of stop ribs 512), it will be appreciated that any number of bridges 504 may be included in the one or more sets of stop ribs 506, as desired. In alternative embodiments, no bridge 504 may be present to couple the stop ribs 506 within each set of stop ribs 506. As a result, the bridge 504 coupled to each of the stop ribs 506 may serve to strengthen the third projection 500. Further, bridge 504 coupled to one or more stop ribs 506 may be formed from molding, such as injection molding of a plastic material.

Moreover, each of the first set of stop ribs 502 and the second set of stop ribs 512 may include one or more ridges 550, wherein the one or more ridges 550 may stably couple one or more stop ribs 506 to the inner surface 302 of insert 300. As such, the one or more ridges may be arranged along the inner circumference In one embodiment, for a thinner nozzle (e.g., a nozzle having a diameter of approximately 24 mm; not shown), each set of stop ribs 506 may engage with and hold an outer surface of the nozzle. In another embodiment, for a thicker nozzle (e.g., a nozzle having a diameter of approximately 36 mm; not shown), each set of stop ribs 506 may hold an outlet of the nozzle. In this way, the third projection 500 may guide the nozzle to a desired position and orientation, while providing a constraining force on the nozzle to reduce movement towards the fuel tank 20. In other words, the first set of stop ribs 502 and the second set of stop ribs 512 restrict the nozzle so that the outlet of the nozzle may not go farther down into filler pipe 26 to a level that is lower than the requirement fuel level. Additionally, the second end 303 of the insert 300 having the first set of stop ribs 502 and the second set of stop ribs 512 about the central opening 320 provides for a path for fuel, such as diesel fuel, to flow to the fuel tank 20, while preventing the fuel from being reflected back into the nozzle. Therefore, premature shutoff may be avoided.

Turning now to FIGS. 5A and 5B, a back perspective view and sectional view of insert 300 is shown, respectively. As shown in one example, a first axial length 650, e.g., first axial length of the first projection 306, a second axial length 640, e.g., second axial length of the second projection 400, and a third axial length 620, e.g., third axial length of the third projection 500, are illustrated. In the depicted example, first axial length 650 of the first projection 306 may be greater than the second axial length 640 of the second projection 400. The second axial length 640 of the second projection 400 may be greater than the third axial length 620 of the third projection 500. However, in other examples, the first axial length 650 may be substantially similar to the second axial length 640. It should be appreciated, as mentioned before, that the axial lengths of the first projection 306, second projection 400, and/or third projection 500 may vary depending on desired positioning and orientations of various refueling nozzles coupled to insert 300 during the refueling event.

Insert 300 may further include one or more interference ribs 602 may be provided on the outer surface 304 of insert 300. In one embodiment, the one or more interference ribs 602 may comprise one or more ribs traversing the longitudinal length on the outer surface 304 of insert 300 along an axis substantially parallel to the central axis 305. In the depicted example, the one or more interference ribs 602 may be narrow in width, and may be arranged along the exterior circumference 360 of the insert 300 approximately 180 degrees apart. In another example, one interference rib 602 may be provided. In yet another example, three interference ribs 602 may be provided, wherein each interference rib 602 may be 120 degrees apart. In an alternative embodiment, the interference rib(s) 602 do not span the entirety of the longitudinal length on the outer surface 304 of insert 300, but may instead span at least a portion of the outer surface 304 of insert 300. The one or more interference ribs 602 are provided to increase friction between the filler pipe 26 and the insert 300, such that a desired location, orientation, and/or resistance to rotation and undesired movement are achieved.

As shown in FIG. 5A, insert 300 may include an annular ring collar 604, the ring collar 604 positioned around an entirety of the exterior circumference 360 of inlet 380 of insert 300. In one embodiment, the ring collar 604 may be positioned substantially at first end 301 proximate the refueling nozzle and mouth 24 of the refueling assembly 19. In one example, the ring collar 604 may be 1 mm in width. In another example, the ring collar 604 may be 2 mm in width. In yet another example, the ring collar 604 may be 0.5 mm in width.

When insert 300 is inserted into filler pipe 26 during a refueling event, the ring collar 604 may engage with and fit within a complementary ring groove 606 disposed on an interior surface of the filler pipe 26. In particular, the complementary ring groove 606 may be provided on one of an interior surface or interior surface of the filler pipe 26 substantially about a circumference of the filler pipe 26. Further, the complementary ring groove 606 may be etched, drilled, machined, and/or forged into the filler pipe 26, and/or cast as part of the filler pipe 26. As such, the ring collar 604 of insert 300 may allow a secure and air-tight sealing surface at the filler pipe 26 such that the coupling of insert 300 and the filler pipe 26 are substantially air-tight and fastened together.

Insert 300 may further include a locating rib 608, the locating rib 608 (herein also termed a pin rib 608) arranged on the outer surface 304 of the insert 300. In one example, the locating rib 608 may be positioned immediately adjacent to the ring collar 604 towards the second end 303. In another example, the locating rib 608 may be arranged on the outer surface 304 of insert 300 adjacent to an edge of the first end 301. In one embodiment, the locating rib 608 may have a desired shape and orientation complementary in shape and orientation of a scotch 610 machined in the filler pipe 26. In the depicted example, one locating rib 608 is provided on outer surface 304 of insert 300. In other examples, two or three locating ribs 608 may be provided at various locations on the outer surface 304. For example, one or more of the locating ribs 608 may be positioned at or adjacent to the second end 303 and/or the medial area 401 of the outer surface 304. As such, any number of locating ribs 608 may be positioned at any suitable portion of insert 300 to fit in a complementary manner into one or more scotches 601 provided in filler pipe 26. In this way, the insert 300 having locating rib 608 may reduce risk of the insert 300 being undesirably pulled out and/or rotating while a nozzle is fitted into filler pipe 26 via insert 300 during the refueling event.

Figure 6A:
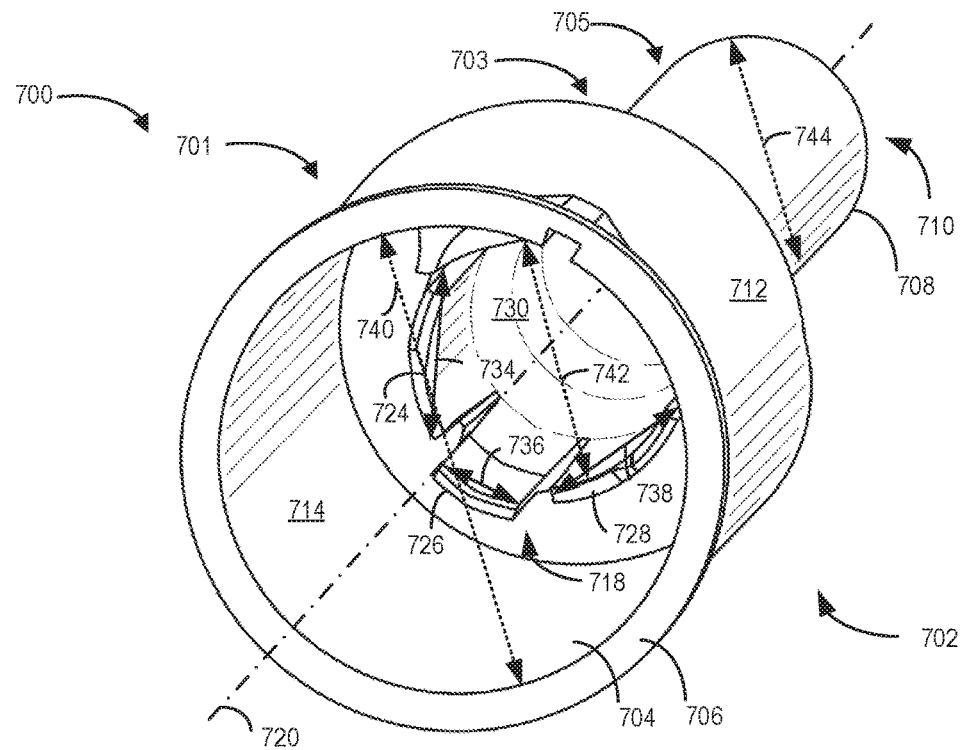
FIGS. 6A and 6B show a perspective view of an example funnel, and a perspective view of the example funnel coupled to the first embodiment of the insert.
Figure 6B:
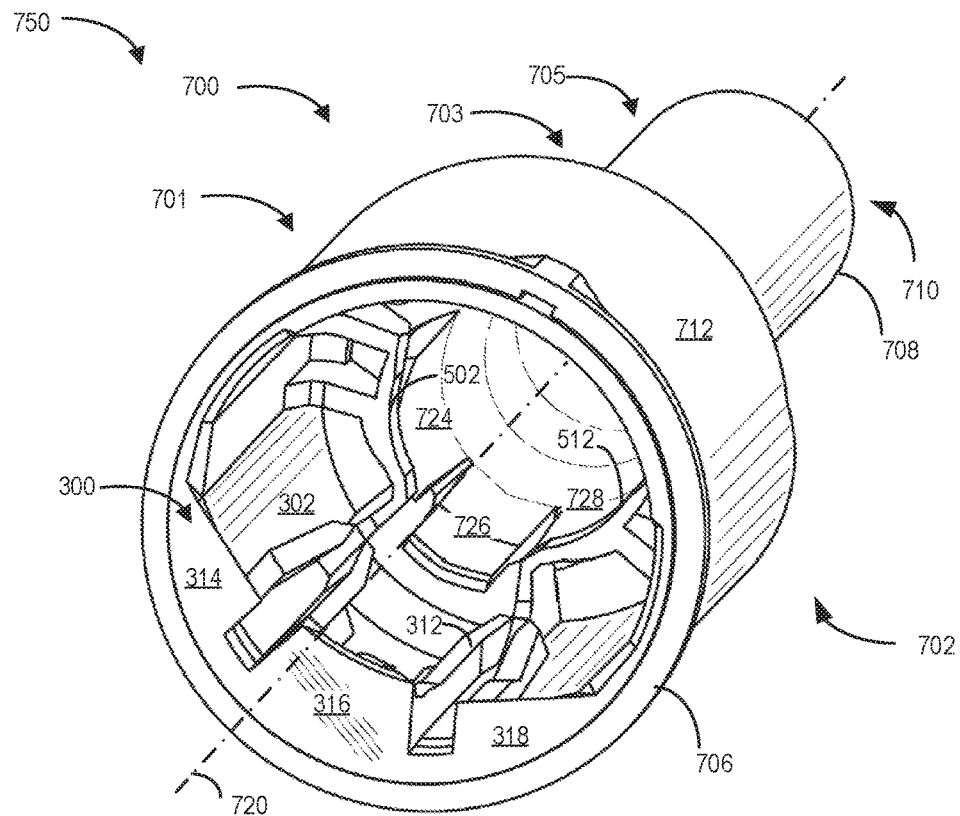

Turning now to FIGS. 6A and 6B, a first perspective view (e.g., front perspective view) of a refueling funnel 700 (FIG. 6A) may be provided, wherein the refueling funnel 700 may be operably and reversibly coupled to insert 300 (FIG. 6B). Although refueling funnel 700 is shown coupled with insert 300, in alternate embodiments the funnel 700 and insert 300 may be formed together as one piece (e.g., molded together, fused, welded, etc.). The refueling funnel 700 may be configured to receive insert 300 and/or a refueling nozzle (such as the fuel nozzles shown by FIG. 10 and described below). As such, a refueling structure 750 may be provided, the refueling structure 750 comprising both the refueling funnel 700 and the insert 300 when said funnel and insert are operably coupled to one another. The refueling funnel shown in FIGS. 6-7 comprises a funnel body 702 with a first opening 704 at a first end 706 and a second opening 708 at a second end 710. First opening 704 at first end 706 of refueling funnel 700 may be configured to receive insert 300, such that refueling funnel 700 may envelop insert 300 along the outer surface 304 of insert 300.

In one embodiment, the first opening 704 may be larger than the second opening 708. For example, a size of first opening 704, e.g., a diameter of the first opening 704 may be at least twice as large as a size of second opening 708, e.g., a diameter of the second opening 708 to accommodate the insert 300, as well as different fuel sources. For example, the first opening 704 at the first end 706 may be sized to receive insert 300 and/or nozzles from a variety of refueling devices such as refueling cans, pump nozzles, or other non-standard fuel sources. As such, the first opening 704 may have a greater circumference as compared to a circumference of insert 300 along outer surface 304. In other embodiments, the first opening 704 may have a greater circumference as compared to a circumference of various refueling nozzles (not shown) along an outer surface. The second end 710 of the refueling funnel may be inserted into a refueling system, such as capless refueling assembly 19, to unlatch and/or open the upstream door 210 and/or downstream door 226 so that fuel tank 20 may be refueled with a fuel nozzle or other fuel source.

Each of an outer surface 712 and an inner surface 714 of funnel body 702 may be composed of a plastic material. In another example, another inexpensive plastic, elastomeric, or plastic-like material may be used to manufacture funnel body 702. In alternative examples, a metal, such as aluminum, may be used to manufacture the funnel body 702. As yet another example, funnel body 702 may be manufactured with a combination of two or more of the materials described above. For example, the funnel body 702 may be formed from injection-molded tooling. Further, as shown in FIGS. 6-7, the funnel body 702 includes a central axis 720 extending through a center of the first opening 704 through the funnel body 702 along a direction between first end 706 and second end 710, and a center of the second opening 708. In one example, the central axis 720 may substantially coincide and overlap with central axis 305 of insert 300.

The funnel body 702 may have an annular cross-section, such as circular, elliptical, or oval cross-sections throughout the funnel body, in some examples. However, in other examples, the funnel body 702 may have any other suitable cross sections throughout the body to direct fuel from a fuel source provided at first opening 704 into a refueling system, such as refueling assembly 19, via second opening 708. For example, the refueling funnel 700 of FIGS. 6-7 may have substantially annular sections throughout the funnel body 702. As shown in front perspective view of FIG. 7A, the cross sections of the funnel body 702 may each have a diameter, which may vary through the funnel body 702. The diameter of each annular cross section may be defined along an axis substantially perpendicular to central axis 720.

Funnel body 702 may comprise three adjoining and contiguous portions: an upper portion 701 adjacent to first end 706, a lower portion 705 adjacent to second end 710, and a central portion 703 between upper portion 701 and lower portion 705. As discussed above, upper portion 701 may receive insert 300, such that the circumference of inner surface 714 may envelop outer surface 304 of insert 300 about its exterior circumference 360. As such, a diameter 740 of a cross-section of upper portion 701 may be greater than a diameter of a cross-section of insert 300. Further, upper portion 701 may be substantially cylindrical in shape. Central portion 703 may also include one or more ribs or projections to hold, position, and/or reduce fuel backflow during the refueling event. The lower portion 705 at the second end 710 of the refueling funnel 700 may extend a desired length from central portion 703, wherein the desired length is a length allowing unlatching and/or opening of the one or more doors of refueling assembly 19 when the refueling funnel 700 or the refueling structure 750 (e.g., the refueling funnel 700 coupled to the insert 300) is inserted into a refueling system, such as refueling assembly 19. In this way, fuel tank 20 may be refueled with a fuel nozzle or other fuel source.

In some examples, cross-sectional areas of each section of the funnel body 702 may be circular or oval-shaped. However, in other examples, cross-sectional areas of the funnel body may vary. For example, cross-sectional areas of the funnel body along a cross section of the upper portion may be oval-shaped, cross-sectional areas of the central portion 703 may be circular shaped, and cross-sectional areas of the lower portion 705 may be oval shaped. However, it should be understood that any suitable cross-sections throughout the funnel body may be used.

In addition, sizes of cross-sections, e.g., diameters in the upper portion 701, central portion 703, and lower portion 705 of the funnel body 702 may vary from the first end 706 to the central portion 703, and the central portion 703 to the second end 710 along central axis 720. In one example, diameter 740 of a cross-section of the upper portion 701 may be greater than the diameter 742 of central portion 703. Similarly, a diameter 740 of a cross-section of the upper portion 701 may be greater than a diameter 744 of a cross-section of the lower portion 705. In one example, cross-sections of the funnel body 702 in the central portion 703 may be substantially the same as the lower portion 705. In another example, cross-sections of the funnel body 702 in the central portion 703 may be greater in size than lower portion 705. Moreover, cross sections of the funnel body 702 in the central portion 703 may vary, e.g., diameters of cross-sections may decrease in a direction from the upper portion 701 towards the lower portion 705 in order to extend the funnel shape of upper portion 701.

Inner surface 714 of funnel body 702 may include an inner surface 730 of central portion 703. In one embodiment, inner surface 730 may further comprise a plurality of projections 718 extending from central portion 703 to upper portion 701. In one embodiment, the plurality of projections 718 of funnel body 702 may be arranged around an inner circumference of the inner surface 730. Further, the plurality of projections 718 of funnel body 702 may extend along central axis 720 towards upper portion 701. In another embodiment, the plurality of projections 718 of funnel body 702 may extend along central axis 720 towards lower portion 705.

As depicted in FIG. 6A, the plurality of projections 718 may include a first projection 724, a second projection 726, and a third projection 728, wherein the second projection 726 may be positioned between the first projection 724 and the third projection 728. In an embodiment, additional projections (e.g., three or more total projections, such as six projections) may be provided. In another embodiment, fewer than three projections may be provided, as desired. Moreover, the plurality of projections 718 may vary in a longitudinal length along an axis substantially parallel to central axis 720. For example, as shown in FIGS. 6A and 6B, second projection 726 is longer in a longitudinal length than the first projection 724 and the third projection 728. In another example, second projection 726 may be the same longitudinal length as the first projection 724 and the third projection 728. In yet another example, second projection 726 may have a shorter longitudinal length than the first projection 724 and the third projection 728.

Each of the first projection 724, second projection 726, and third projection 728 may be crescent-shaped to follow a curvature of a circumference of inner surface 730 of central portion 703. Further, each of the first projection 724, second projection 726, and third projection 728 may embody varying widths. For example, a width 734 of the first projection 724 and/or a width 738 of the third projection 728 may be greater than a width 736 of the second projection 726. As such, the first projection 724 and the third projection 728 may have similar dimensions, and said projections may be arranged on opposing sides along the inner circumference of the inner surface 730 of central portion 703. In another example, width 734 of the first projection 724, width 738 of the third projection 728, and/or width 736 of the second projection 726 may be substantially the same.

It will be appreciated that the number of projections of the plurality of projections 718 and various dimensions of one or more projections in the plurality of projections 718, including a width, length, and/or thickness, may be adjusted depending on desired configurations for various conditions, including a shape and size of different refueling sources and insert 300.

As mentioned above, insert 300 may be coupled to refueling funnel 700, as shown in FIGS. 6B and 7B. At least a portion of insert 300 may be in touching contact and engaged with at least a portion of the refueling funnel 700. For example, as depicted, at least a portion of second end 303 and/or one or more projections, such as first projection 306, second projection 400, and/or third projection 500, may be in touching contact and engaged with the plurality of projections 718. Specifically, a portion of the third projection 500, namely the plurality of stop ribs 506 and one or more bridges 504, may abut against and be supported, in part, by at least a portion of the plurality of projections 718. For example, the first set of stop ribs 502 may engage with and abut against first projection 724, while the second set of stop ribs 512 may engage with and abut against third projection 728. However, second projection 726 may not abut and engage with any projection, but may instead be positioned between the first set of stop ribs 502 and the second set of stop ribs 512 in the space having the spaced distance 540. Further, in one embodiment, at least a portion of one or more projections, such as second projection 400, may engage with and abut against additional projections of refueling funnel 700 positioned in the refueling funnel, e.g., in the upper portion 701 and/or central portion 703, discussed below in FIGS. 7A and 7B, in some examples. In another embodiment, no projections may contact a portion of the central portion 703 of the refueling funnel 700, and may instead be coupled to refueling funnel via friction between outer surface 304 of insert 300 and inner surface 714 of the funnel body 702.

As such, the exterior circumference 360 of insert 300 having outer surface 304 may be in face-sharing contact with at least a portion of the inner surface 714 of refueling funnel 700. In one embodiment, insert 300 may be enveloped by refueling funnel 700 about the insert's exterior circumference 360, such that insert 300 may fit securely within refueling funnel 700. In one example, first end 301 of insert 300 may be flush with first end 706 of refueling funnel 700. In this way, a source of fuel, such as a refueling nozzle, may be inserted into the refueling structure 750 having insert 300 coupled to refueling funnel 700.

Now turning to FIGS. 7A and 7B, a side cross-sectional view of the refueling funnel 700 (FIG. 7A) and the refueling funnel 700 having insert 300 fitted therein (FIG. 7B) are provided. As shown, the upper portion 701 may span a first length 801, the central portion 703 may span a second length 803, and the lower portion 705 may span a third length 805. In one embodiment, the first length 801 of upper portion 701 may be greater in length than the second length 803 of central portion 703. The third length 805 of lower portion 705 may be greater than each of the first length 801 of upper portion 701 and/or second length 803 of central portion 703. In another embodiment, the first length 801 and second length 803 may be substantially similar. It should be understood that any suitable length may be provided for each of the first length 801, second length 803, and/or third length 805, if desired, for various nozzle shapes and sizes, and/or fuel sources.

Further, as discussed in reference to FIG. 6, sizes of cross-sections, e.g., diameters of a given cross-section of the funnel body 702 may vary from the upper portion 701 at the first end 706 to the central portion 703, and the central portion 703 to the lower portion 705 at the second end 710 along central axis 720. In the depicted example, diameter 740 of a cross-section of the upper portion 701 may be greater than diameter 742 of a cross-section of the central portion 703. Similarly, diameter 740 of the cross-section of the upper portion 701 may be greater than a diameter 744 of a cross-section of lower portion 705. Further, a diameter of a cross-section of the central portion 703 of the funnel body 702 may be substantially similar to a diameter of a cross-section of the lower portion 705. In yet other examples, a diameter of a cross-section of the central portion 703 of the funnel body 702 may be greater than a diameter of a cross-section of the lower portion 705.

In some embodiments, cross-sectional areas in the central portion may be circular and diameters of the circular cross sections throughout the central portion 703 may be substantially the same throughout the central portion. However, in other examples, cross sections of the funnel body 702 in the central portion 703 may vary, e.g., cross-sections may decrease in a direction from the upper portion 701 towards the lower portion 705 in order to extend the funnel shape of upper portion 701.

As such, diameters of cross-sections of the upper portion 701, central portion 703, and/or lower portion 705 may decrease in a direction from first opening 704 to the second opening 708 to create a funnel shape for directing fuel from first opening 704 toward second opening 708 when the funnel is coupled to refueling assembly 19.

In one embodiment, a pocket 802 may be formed on the inner surface 714 of refueling funnel 700, wherein the pocket 802 may be positioned substantially in the upper portion 701 adjacent to an intersection between the upper portion 701 and central portion 703. In one example, pocket 802 may be formed from an extension piece 806 of a piece of the central portion 703 towards first end 706. As such, at least a portion of one or more projections, such as second projection 400, may engage with pocket 802 of refueling funnel 700. Specifically, in an example, the second portion 410 of the plurality of constraint ribs 402 may be positioned immovably within pocket 802 during the refueling event. Thus, increased support and stability may be provided for insert 300 when insert 300 is fitted within refueling funnel 700.

The positions and configurations of the plurality of projections 718, as well as of pocket 802, enable a secure and fastened coupling of the insert 300 to the refueling funnel 700. Moreover, the specific positions and configurations also reduce risk of fuel back flowing from downstream of the insert 300 back up towards the inlet 380 of insert 300. Thus, the refueling structure 750 may provide a desired level of refueling of the fuel tank given a variety of nozzle types.

Figure 8A:
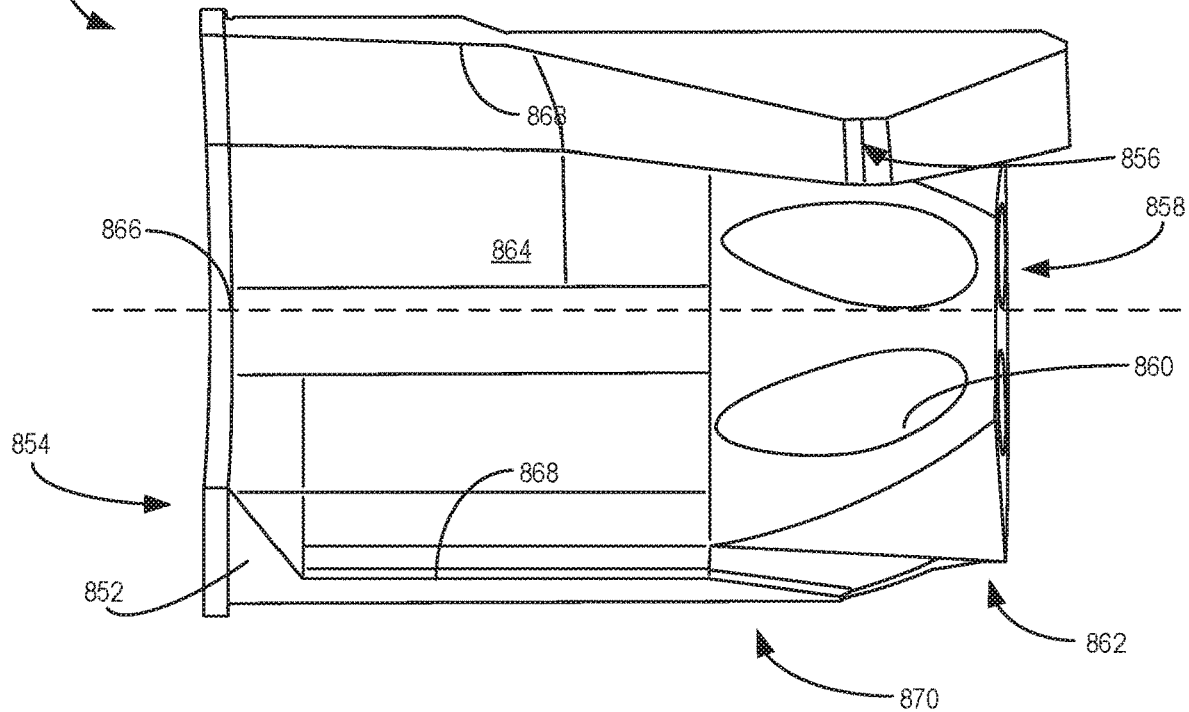
FIGS. 8A-8B show a cross-sectional view and a perspective view of a second embodiment of an insert for a filler pipe.
Figure 8B:
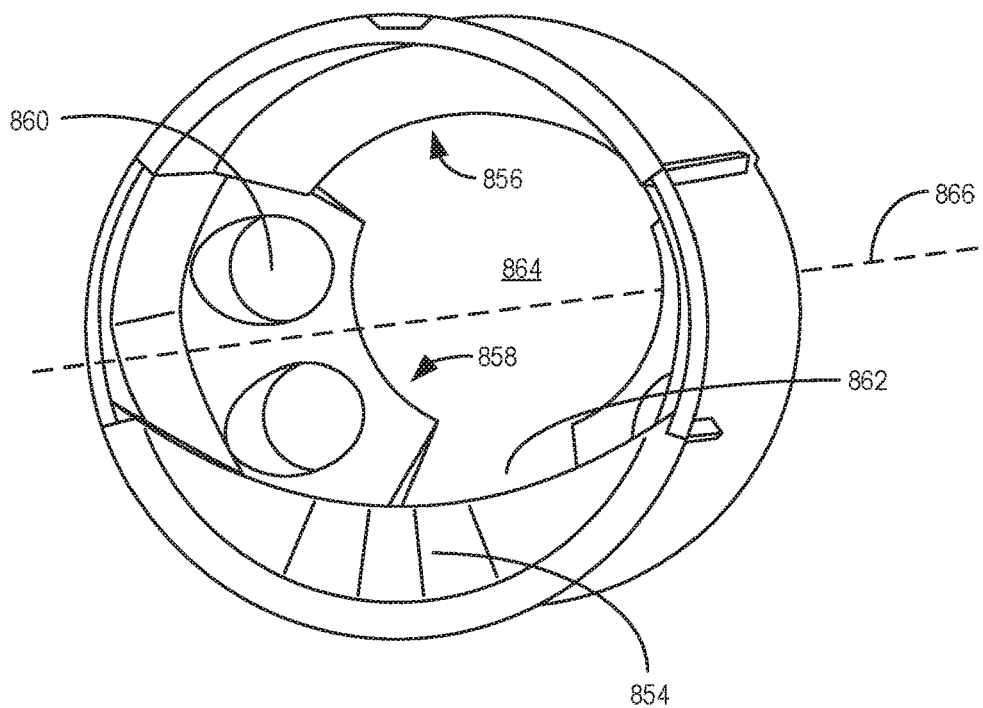

FIGS. 8A-8B show a second embodiment of an insert 850 for a refueling system of a vehicle, with the insert 850 including a first projection 854, a second projection 856, and a third projection 858. The insert 850 is configured to couple with a filler pipe of the refueling system, such as the filler pipe 26 shown by FIG. 1. In the embodiment shown by FIGS. 8A-8B, the first projection 854, second projection 856, and third projection 858 are positioned within the insert 850 in a similar arrangement relative to the first projection 306, second projection 400, and third projection 500 of the insert 300 shown by FIGS. 2-7 and described above. However, the first projection 854, second projection 856, and third projection 858 shown by FIGS. 8A-8B are formed by a plurality of tapered ring-like extensions, with each of the projections extending from an inner surface 868 of the insert 850 towards a central axis 866 of the insert 850. Within the insert 850, an opening 864 is formed, through which a fuel nozzle (such as the fuel nozzles shown by FIG. 10 and described above) may be inserted.

Similar to the embodiment of the insert 300 described above, the insert 850 includes a plurality of apertures 860 formed by the third projection 858. The third projection 858 also forms an aperture 862 positioned along a bottom 870 (e.g., relative to a surface on which the vehicle sits, such as ground surface 17 shown by FIG. 1) of the insert 850. Together, the apertures 860 and 862 may increase a flow rate of fuel from a fuel nozzle coupled to the insert 850 by reducing an amount of impedance of the fuel flow. Additionally, an upstanding portion 852 (similar to upstanding portion 307 described above) in combination with the first projection 854, second projection 856, and third projection 858 may retain a substantially centered position (e.g., a position along central axis 866 and approximately parallel to central axis 866) of a fuel nozzle when the fuel nozzle is inserted into the insert 850.

FIGS. 9A-9B show a third embodiment of an insert 950 for a refueling system of a vehicle, with the insert 950 including a first projection 954, a second projection 956, and a third projection 958. The insert 950 is configured to couple with a filler pipe of the refueling system, such as the filler pipe 26 shown by FIG. 1. In the embodiment shown by FIGS. 9A-9B, the first projection 954, second projection 956, and third projection 958 are positioned within the insert 950 in a similar arrangement relative to the first projection 306, second projection 400, and third projection 500 of the insert 300 shown by FIGS. 2-7, and the first projection 854, second projection 856, and third projection 858 shown by FIGS. 8A-8B. However, the first projection 954, second projection 956, and third projection 958 shown by FIGS. 9A-9B are formed by a plurality of thin rings, with each of the projections extending from an inner surface 968 of the insert 950 towards a central axis 966 of the insert 950. Within the insert 950, an opening 964 is formed, through which a fuel nozzle (such as the fuel nozzles shown by FIG. 10 and described above) may be inserted.

Similar to the first embodiment of the insert 300 and the second embodiment of the insert 850 described above, the insert 950 includes a first plurality of apertures 960 formed by the third projection 958. The insert 950 additionally includes a second plurality of apertures 975 formed by the second projection 956. The third projection 958 also forms an aperture 962 positioned along a bottom 970 (e.g., relative to a surface on which the vehicle sits, such as ground surface 17 shown by FIG. 1) of the insert 950. Together, the apertures 960, 962, and 975 may increase a flow rate of fuel from a fuel nozzle coupled to the insert 950 by reducing an amount of impedance of the fuel flow. Additionally, an upstanding portion 952 (similar to upstanding portion 307 and upstanding portion 852, described above) in combination with the first projection 954, second projection 956, and third projection 958 may retain a substantially centered position (e.g., a position along central axis 966 and approximately parallel to central axis 966) of a fuel nozzle when the fuel nozzle is inserted into the insert 950.

Turning now to FIG. 11, the insert 300 is shown coupled with a filler pipe 1100, such as the filler pipe 26 of the vehicle system 6 shown by FIG. 1. As shown, the aperture 542 forms a fuel flow path from the insert 300 into the filler pipe to enable an increased fuel flow rate with a decreased amount of flow impedance. In the embodiment shown, the aperture 542 is provided at the bottom 1102 of the insert 300. In other words, the aperture 542 is positioned below the central axis 305 of the insert 300 relative to a surface on which the vehicle sits (as shown by FIG. 1) to enable gravity to flow fuel from a fuel nozzle coupled to the insert 300 (as shown by FIGS. 12A-12B and described below) into the filler pipe 1100.

FIG. 12A shows a low-flow fuel nozzle 1200 (similar to first nozzle 1002, or second nozzle 1004, shown by FIG. 10) inserted through the central opening 320 of the insert 300, while FIG. 12B shows a high-flow fuel nozzle 1202 inserted through the central opening 320 of the insert 300. As is further illustrated, the aperture 542 provides a flow path for either fuel or air without restriction. The low-flow fuel nozzle 1200 is shown to include a shutoff aspirator 1204, which may decrease a flow of fuel from the low-flow fuel nozzle 1200 when a fuel level of the filler pipe 1100 reaches the shutoff aspirator 1204. Additionally, shutoff aspirator 1204 is shown positioned within the filler pipe 1100 away from the central opening 320 and the insert 300, but in other embodiments, the shutoff aspirator 1204 may be positioned in-line (in a direction parallel to the central axis 305) with the aperture 542 or the aperture 534 to enable proper shutoff operation of the low-flow fuel nozzle 1200.

Apertures 542 and 534 provide open spaces within the insert 300 to increase a fuel flow rate from high-flow fuel nozzle 1202. By providing the apertures 542 and 534, fuel may flow from high-flow fuel nozzle 1202 through each aperture 542 and 534, thereby decreasing an amount of flow impedance of the fuel flow. Additionally, apertures 542 and 534 increase an air flow through insert 300, which may reduce a likelihood of premature shutoffs (PSO) of a fuel nozzle (such as fuel nozzles 1200 or 1202).

FIG. 13 shows the second end 303 of the insert 300. The projections at the second end 303 are sized to ensure the nozzles are substantially centered (e.g., positioned along the central axis 305) within the insert 300, and to help retain the nozzle in the filler. Accordingly, a first radial distance 1300 between the central axis 305 and the third projection 500, as well as a second radial distance 1302 between the central axis 305 and the second projection 400, are each large enough to permit a tip of a low-flow fuel nozzle (such as the low-flow fuel nozzle 1200 shown by FIG. 12A) to extend through the second end 303 of the insert 300, as shown by FIG. 12A. However, the first radial distance 1300 is not large enough to permit a high-flow fuel nozzle (such as the high-flow fuel nozzle 1202 shown by FIG. 12B) to extend through the second end 303 of the insert 300, as shown by FIG. 12B. The first radial distance 1300 and the second radial distance 1302 are each distances from the central axis 305 in directions perpendicular to the central axis 305 (e.g., extending radially relative to the central axis 305).

As shown by FIG. 5B, the second projection 400 may include a shoulder 313 having a height 315 in order to couple in face-sharing contact with the a fuel nozzle spring (such as the fuel nozzle springs 1001, 1003, 1005, 1007, and 1009 shown by FIG. 10) to retain a fuel nozzle in the insert 300. Similarly, although a high-flow fuel nozzle cannot extend through the second end 303 of the insert 300, the second projection 400 is sized to retain a high-flow fuel nozzle substantially centered within the central opening 320 (e.g., positioned along the central axis 305) to increase a flow of fuel from the high-flow fuel nozzle. The second projection 400 may include the shoulder 313 with the height 315 (as shown by FIG. 5B and described above) in order to retain the high-flow fuel nozzle into position (e.g., in a position substantially centered within the central opening 320 as described above) by positioning a fuel nozzle spring (such as the springs 1001, 1003, 1005, 1007, or 1009 described above) into face-sharing contact with the shoulder 313. In another example, a nozzle retaining ring (e.g., such as the nozzle retaining rings 1010 or 1011 shown by FIG. 10) may be positioned into face-sharing contact with the shoulder 313 in order to retain the high-flow fuel nozzle in the substantially centered position, as described above. In each example, the third projection 500 prevents the high-flow fuel nozzle from extending through the second end 303 of the insert 300 and into the filler pipe (e.g., such as filler pipe 1100 shown by FIG. 11 and FIGS. 12A-12B). The second projection 400 and third projection 500 may together retain a low-flow fuel nozzle or a high-flow fuel nozzle in a position along the central axis 305 of the insert 300.

As shown by FIG. 13, the aperture 542 is included at the bottom 1102 of the insert 300 (as installed in the vehicle, such as vehicle system 6 shown by FIG. 1). Accordingly, aperture 542 provides for an uninterrupted flow area at the second end 303 of the insert 300. As described above, a plurality of other apertures are provided to increase the available flow area in the insert 300 (such as 531, 534, etc.).

Turning now to FIG. 14, a partial cross-sectional view of the insert 300 coupled to the refueling funnel 700 is shown, including a low-flow fuel nozzle 1400 (e.g., similar to the first nozzle 1002 and second nozzle 1004 shown by FIG. 10) coupled to the insert 300 and refueling funnel 700. The low-flow fuel nozzle 1400 includes a nozzle spring 1402, similar to the nozzle springs 1001 and 1003 shown by FIG. 10 and described above. The upstanding portion 307 of the insert 300 may be used to retain a position of the low-flow fuel nozzle 1400 within the insert 300 and refueling funnel 700. For example, when a coil of the nozzle spring 1402 is positioned in face-sharing contact with the upstanding portion 307, the low-flow fuel nozzle 1400 may be retained within the insert 300.

As shown by FIG. 14, the refueling funnel 700 includes a first portion 1404 and a second portion 1406 positioned approximately in a same axial position (e.g., a same position along central axis 305) as the third projection 500 when the insert 300 is coupled within the refueling funnel 700. In this position, when the low-flow fuel nozzle 1400 is inserted into the insert 300 and the refueling funnel 700, the first portion 1404 and the second portion 1406 expand in a radial direction relative to the central axis 305 such that an end of the low-flow fuel nozzle 1400 fits within an interior of the refueling funnel 700. In this way, the first portion 1404, second portion 1406, and upstanding portion 307 may retain a position of the low-flow fuel nozzle 1400 within the refueling funnel 700.

FIGS. 15-17 each show different views of a first alternate embodiment of a refueling funnel, similar to the refueling funnel 700 described above. Reference axes 1599 are included by each of FIGS. 15-17 for relative comparison of the views shown. FIGS. 15-16 include cross-sectional views of refueling funnel 1500, and FIG. 17 shows a perspective view of the refueling funnel 1500 from a front end 1506 of the refueling funnel 1500. Specifically, FIG. 15 shows a cross-sectional view of the refueling funnel 1500 along axis 1516 of FIG. 16, and FIG. 16 shows a cross-sectional view of the refueling funnel 1500 along axis 1514 of FIG. 15 and FIG. 17. The axis 1514 extends in a direction from front end 1506 to rear end 1508 and intersects a center of each of first opening 1510 positioned at the front end 1506 and second opening 1512 positioned at the rear end 1508. The axis 1514 may be referred to herein as a central axis of the refueling funnel 1500.

The refueling funnel 1500 shown by FIGS. 15-17 may include several elements similar to those described above with reference to refueling structure 750. For example, refueling funnel 1500 may include a plurality of anchor rib pieces 1525 similar to anchor rib pieces 314, 316, and 318, axial ramp ribs 1527 similar to axial ramp ribs 312, etc. Further, refueling funnel 1500 includes additional features configured to reduce fuel flow turbulence (e.g., bubbling, foaming, etc.) during conditions in which fuel flows into the refueling funnel 1500 (e.g., during refueling of a vehicle). Specifically, the refueling funnel 1500 includes a fence 1502 having a plurality of apertures 1503 fluidly coupled to a reservoir 1504, thereby providing a venting path for fuel entering the refueling funnel 1500. Fuel may flow from a fuel nozzle (e.g., similar to the fuel nozzles described above) through the apertures 1503 and into the reservoir 1504 during refueling in order to reduce foaming, spitback, etc. resulting from fuel colliding with surfaces of the refueling funnel 1500 (e.g., due to a reduced diameter 1520 of the refueling funnel 1500 relative to a diameter of a nozzle inserted into the refueling funnel 1500). In this way, a likelihood of premature shut-off (PSO) of the nozzle due to fuel foaming or spitback may be reduced. Additionally, a refueling rate of the nozzle may be increased. In some examples, the refueling rate may be increased from 7 gallons-per-minute (GPM) to 14 GPM by utilizing the refueling funnel 1500.

A second alternate embodiment of a refueling funnel 1800 is shown by FIGS. 18-20. The refueling funnel 1800 may include several elements similar to those described above with reference to refueling funnel 1500. Similar elements may be labelled similarly and not re-introduced. Reference axes 1899 are included by each of FIGS. 18-20 for relative comparison of the views shown. FIGS. 18-19 include cross-sectional views of refueling funnel 1800, and FIG. 20 shows a perspective view of the refueling funnel 1800 from a front end 1805 of the refueling funnel 1800. Specifically, FIG. 18 shows a cross-sectional view of the refueling funnel 1800 along axis 1816 of FIG. 19, and FIG. 19 shows a cross-sectional view of the refueling funnel 1800 along axis 1814 of FIG. 18 and FIG. 20. The axis 1814 extends in a direction from front end 1805 to rear end 1808 and intersects a center of each of first opening 1810 positioned at the front end 1805 and second opening 1812 positioned at the rear end 1808. The axis 1814 may be referred to herein as a central axis of the refueling funnel 1800.

In the second alternate embodiment, the refueling funnel 1800 includes a fence 1802 having a plurality of slots 1803 fluidly coupled to a reservoir 1804. In one example, the slots 1803 extend in a direction parallel to the axis 1814. Similar to the example described above with reference to the apertures 1503 of the refueling funnel 1500, the slots 1806 and reservoir 1804 may provide a venting path for fuel entering the refueling funnel 1800. Fuel may flow from a fuel nozzle (e.g., similar to the fuel nozzles described above) through the slots 1806 and into the reservoir 1804 during refueling in order to reduce foaming, spitback, etc. resulting from fuel colliding with surfaces of the refueling funnel 1800 (e.g., due to a reduced diameter 1820 of the refueling funnel 1800 relative to a diameter of a nozzle inserted into the refueling funnel 1800). In this way, a likelihood of premature shut-off (PSO) of the nozzle due to fuel foaming or spitback may be reduced. Additionally, a refueling rate of the nozzle may be increased. In some examples, the refueling rate may be increased from 7 GPM to 14 GPM by utilizing the refueling funnel 1800.

In some examples, refueling funnel 1500 and refueling funnel 1800 may decrease fuel turbulence by different amounts for different types of fuel (e.g., different flow rates, fuel viscosity, etc.).

The technical effect of such systems described in FIGS. 2-20 is the effective, efficient, and reliable delivery of fuel to a fuel tank to a desired level with reduced risk of premature shut-off and spill back of fuel. Specifically, from a fuel source via a refueling nozzle, the fuel may be supplied through inlet 380 of insert 300, the fuel then guided via the first projection 306, the second projection 400, and/or the third projection 500 through an interior volume of the insert 300. Subsequently, the fuel may travel through the central portion 703 and lower portion 705 into the filler pipe 26 and the fuel tank 20. As such, the plurality of projections including the first projection, second projection, and third projection may provide guidance, constraint, and fastened engagement of the nozzle to the filler pipe during refueling events. Note that the example system included herein can be used with various engine and/or vehicle system configurations. Moreover, if an operator of a vehicle accidentally leaves the refueling nozzle in the filler pipe and drives away, the insert may disengage from the refueling nozzle, reducing a risk of serious damage to a vehicle may occur.

FIGS. 2-20 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a refueling system of a vehicle includes: an insert coupled to an inner perimeter of a filler pipe, the insert including: an inner surface having a first projection positioned at a first end and a second projection positioned at a second end, with the first projection and second projection each extending radially inward toward an insert central axis; and an aperture positioned at the second end of the insert adjacent to the second projection. In a first example of the refueling system, a third projection extends radially inward toward the central axis from the inner surface of the insert, with the third projection positioned between the first projection and second projection in a direction parallel to the central axis. A second example of the refueling system optionally includes the first example, and further includes wherein the aperture is positioned radially opposite from the third projection relative to the central axis, and wherein the aperture is formed by both of the inner surface and the second projection. A third example of the refueling system optionally includes one or both of the first and second examples, and further includes wherein the first end is positioned at an outer end of the filler pipe when the insert is coupled to the filler pipe, and wherein the first projection is positioned vertically below the central axis relative to a surface on which the vehicle sits. A fourth example of the refueling system optionally includes one or more or each of the first through third examples, and further includes wherein the second projection is positioned vertically below the central axis relative to the surface on which the vehicle sits. A fifth example of the refueling system optionally includes one or more or each of the first through fourth examples, and further includes wherein the third projection is positioned vertically above the central axis relative to the surface on which the vehicle sits. A sixth example of the refueling system optionally includes one or more or each of the first through fifth examples, and further includes a first surface formed by the first projection adapted to retain a nozzle spring of a refueling nozzle. A seventh example of the refueling system optionally includes one or more or each of the first through sixth examples, and further includes a second surface formed by the third projection adapted to retain one of the nozzle spring and a nozzle retaining ring. An eighth example of the refueling system optionally includes one or more or each of the first through seventh examples, and further includes wherein the second projection and third projection are shaped to hold the refueling nozzle along the central axis of the insert. A ninth example of the refueling system optionally includes one or more or each of the first through eighth examples, and further includes wherein the insert is comprised of plastic, metal, or a combination of plastic and metal. A tenth example of the refueling system optionally includes one or more or each of the first through ninth examples, and further includes wherein the second projection and third projection are shaped to couple with either of a low-flow diesel nozzle or a high-flow diesel nozzle, wherein the low-flow diesel nozzle has a first diameter and the high-flow diesel nozzle has a second diameter, with the second diameter being greater than the first diameter, and wherein a portion of the low-flow diesel nozzle extends beyond the second projection relative to the first end when coupled to the insert, and wherein a portion of the high-flow diesel nozzle does not extend beyond the second projection relative to the first end when coupled to the insert.

In another embodiment, a refueling system of a vehicle includes: an insert coupled to an inner circumference of a filler pipe of the vehicle, wherein the insert includes an inner surface forming a plurality of insert projections adapted to couple with a fuel nozzle, and wherein each projection of the plurality of insert projections forms a plurality of apertures within the insert. In a first example of the refueling system, the plurality of insert projections includes a first projection, a second projection, and a third projection; wherein the first projection is positioned at a first end of the insert; wherein the third projection is positioned at a second end of the insert, opposite the first end; and wherein the second projection is positioned between the first projection and third projection in a direction parallel to a central axis of the insert. A second example of the refueling system optionally includes the first example, and further includes wherein the second projection is positioned a first distance from the central axis and the third projection is positioned a second distance from the central axis, wherein the first distance and second distance are each in directions perpendicular to the central axis, and wherein the first distance is greater than the second distance. A third example of the refueling system optionally includes one or both of the first and second examples, and further includes wherein the first projection, second projection, and third projection are each comprised of bumps, beads, rings, axial ribs, radial ribs, orthogonal ribs, or cones. A fourth example of the refueling system optionally includes one or more or each of the first through third examples, and further includes wherein the first projection includes an upstanding portion and the second projection includes a shoulder, and wherein the upstanding portion and shoulder are adapted to retain a position of the fuel nozzle within the insert.

In one embodiment, an insert for a refueling system of a vehicle includes: an inner surface having a first projection spanning a first axial length, a second projection spanning a second axial length, and a third projection spanning a third axial length. In a first example of the insert, the first projection is positioned on an inner surface of the insert at a first end of the insert; wherein the first projection comprises an anchor rib arranged perpendicular to a central axis of the insert; wherein the first projection further comprises a plurality of ramp ribs coupled to the anchor rib; wherein the plurality of ramp ribs is arranged parallel to the central axis of the insert; and wherein the second projection is positioned on the inner surface of the insert at a second end of the insert opposite the first projection, the second end of the insert proximate a fuel tank of the vehicle. A second example of the insert optionally includes the first example, and further includes wherein the second projection comprises a plurality of constraint ribs connected together via a connector rib, the plurality of constraint ribs arranged parallel to the central axis of the insert; wherein the third projection is positioned on the inner surface of the insert at the second end of the insert; wherein the third projection comprises a plurality of stop ribs arranged parallel to the central axis of the insert; and wherein the third projection engages with either a spring on an outer surface of a nozzle or with an outlet of the nozzle. A third example of the insert optionally includes one or both of the first and second examples, and further includes wherein an outer surface of the insert includes one or more interference ribs, one or more locating ribs, and at least one ring collar to allow the insert to be coupled to a filler pipe in a desired orientation; wherein the first axial length of the first projection is greater than the second axial length of the second projection; wherein the second axial length of the second projection is greater than the third axial length of the third projection; wherein an axial extent of the insert is not uniform along a circumference at the second end of the insert; and wherein each of the plurality of ramp ribs of the first projection, the plurality of constraint ribs of second projection, and the plurality of stop ribs of the third projection varies in a height along their axial length.

In one embodiment, a refueling funnel for a vehicle includes: an insert coupled to an inner perimeter of the funnel, the insert including: an inner surface having a first projection positioned at a first end and a second projection positioned at a second end, with the first projection and second projection each extending radially inward toward an insert central axis; and an aperture positioned at the second end of the insert adjacent to the second projection. In a first example of the refueling funnel, a third projection extends radially inward toward the central axis from the inner surface of the insert, with the third projection positioned between the first projection and second projection in a direction parallel to the central axis. A second example of the refueling funnel optionally includes the first example, and further includes wherein the aperture is positioned radially opposite from the third projection relative to the central axis, and wherein the aperture is formed by both of the inner surface and the second projection. A third example of the refueling funnel optionally includes one or both of the first and second examples, and further includes wherein the first end is positioned at an outer end of the funnel when the insert is coupled to the funnel, and wherein the first projection is positioned vertically below the central axis relative to a surface on which the vehicle sits. A fourth example of the refueling funnel optionally includes one or more or each of the first through third examples, and further includes wherein the second projection is positioned vertically below the central axis relative to the surface on which the vehicle sits. A fifth example of the refueling funnel optionally includes one or more or each of the first through fourth examples, and further includes wherein the third projection is positioned vertically above the central axis relative to the surface on which the vehicle sits. A sixth example of the refueling funnel optionally includes one or more or each of the first through fifth examples, and further includes a first surface formed by the first projection adapted to retain a nozzle spring of a refueling nozzle. A seventh example of the refueling funnel optionally includes one or more or each of the first through sixth examples, and further includes a second surface formed by the third projection adapted to retain one of the nozzle spring and a nozzle retaining ring. An eighth example of the refueling funnel optionally includes one or more or each of the first through seventh examples, and further includes wherein the second projection and third projection are shaped to hold the refueling nozzle along the central axis of the insert. A ninth example of the refueling funnel optionally includes one or more or each of the first through eighth examples, and further includes wherein the insert and funnel are comprised of plastic, metal, or a combination of plastic and metal. A tenth example of the refueling funnel optionally includes one or more or each of the first through ninth examples, and further includes wherein the second projection and third projection are shaped to couple with either of a low-flow diesel nozzle or a high-flow diesel nozzle, wherein the low-flow diesel nozzle has a first diameter and the high-flow diesel nozzle has a second diameter, with the second diameter being greater than the first diameter, and wherein a portion of the low-flow diesel nozzle extends beyond the second projection relative to the first end when coupled to the insert, and wherein a portion of the high-flow diesel nozzle does not extend beyond the second projection relative to the first end when coupled to the insert.

In another embodiment, a refueling system of a vehicle includes: an insert coupled to an inner circumference of a funnel, wherein the funnel is coupled to an inner circumference of a filler pipe, the funnel comprising at least one funnel projection, and wherein the insert includes an inner surface having a plurality of insert projections. In a first example of the refueling system, the funnel includes an upper portion having a first circumference and a lower portion having a second circumference, the first circumference different than the second circumference. A second example of the refueling system optionally includes the first example, and further includes wherein the insert is coupled to the upper portion of the funnel, and wherein the funnel has a central axis along a longitudinal length of the funnel, the insert further having an axis substantially parallel to the central axis of the funnel. A third example of the refueling system optionally includes one or both of the first and second examples, and further includes wherein the plurality of insert projections includes a first insert projection spanning a first axial length, a second insert projection spanning a second axial length, and a third insert projection spanning a third axial length. A fourth example of the refueling system optionally includes one or more or each of the first through third examples, and further includes wherein the at least one funnel projection extends along the longitudinal length of the funnel parallel to the central axis, the at least one funnel projection extending toward the upper portion of the funnel.

In one embodiment, a refueling structure for a filler pipe of a vehicle includes: a funnel coupled to an inner circumference of the filler pipe, the funnel comprising a plurality of finger ribs extending from a middle portion of the funnel to an upper portion of the funnel. In a first example of the refueling structure, the funnel further comprises a lower portion, the lower portion of the funnel engaging with and opening one or more doors in the filler pipe when the funnel is inserted into the filler pipe. A second example of the refueling structure optionally includes the first example, and further includes wherein the funnel includes a central axis, and wherein the plurality of finger ribs extends along a longitudinal length of the funnel parallel to the central axis, and wherein the plurality of finger ribs engages with a nozzle of a fueling source or an insert sleeve during a refueling event. A third example of the refueling structure optionally includes one or both of the first and second examples, and further includes wherein the funnel includes the upper portion having a first circumference and the lower portion having a second circumference, the first circumference different than the second circumference.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A refueling funnel for a vehicle, comprising:
an insert coupled to an inner perimeter of the funnel, the insert including:
an inner surface having a first projection positioned at an inlet and a second projection positioned at an outlet end, with the first projection and the second projection each extending radially inward toward an insert central axis;
an inlet side of the first projection forming an exterior of the insert and an outlet side of the first projection having ribs extending toward the outlet end;
an inlet side of the second projection contacting a fuel nozzle and an outlet side of the second projection having ribs extending toward the outlet end; and
an aperture through an exterior wall of the insert positioned at the outlet end of the insert adjacent to the second projection.

2. The funnel of claim 1, further comprising a third projection extending radially inward toward the central axis from the inner surface of the insert, with the third projection positioned between the first projection and the second projection in a direction parallel to the central axis.

3. The funnel of claim 2, wherein the aperture is positioned radially opposite from the third projection relative to the central axis, and wherein the aperture is formed by both of the inner surface and the second projection.

4. The funnel of claim 2, wherein the inlet is positioned at an inlet end of the funnel when the insert is coupled to the funnel, and wherein the first projection is positioned vertically below the central axis.

5. The funnel of claim 4, wherein the second projection is positioned vertically below the central axis.

6. The funnel of claim 5, wherein the third projection is positioned vertically above the central axis.

7. The funnel of claim 6, wherein the outlet side of the first projection is positioned to retain a nozzle spring of a refueling nozzle within the insert.

8. The funnel of claim 7, wherein an outlet side of the third projection is positioned to retain one of the nozzle spring and a nozzle retaining ring.

9. The funnel of claim 8, wherein the inlet side of the second projection forms a barrier to prevent the fuel nozzle or the nozzle spring from moving past the second projection.

10. The funnel of claim 9, wherein the insert and the funnel are comprised of plastic, or a combination of plastic and metal.

11. The funnel of claim 10, wherein the second projection and the third projection are shaped to couple with either of a low-flow diesel nozzle or a high-flow diesel nozzle, wherein the low-flow diesel nozzle has a first diameter and the high-flow diesel nozzle has a second diameter, with the second diameter being greater than the first diameter, and wherein a portion of the low-flow diesel nozzle extends beyond the second projection relative to the inlet when coupled to the insert, and wherein a portion of the high-flow diesel nozzle does not extend beyond the second projection relative to the inlet when coupled to the insert.

12. A refueling system of a vehicle, comprising:
an insert coupled to an inner circumference of a funnel, wherein the funnel is coupled to an inner circumference of a filler pipe, the funnel comprising at least one funnel projection, and wherein the insert includes an inner surface having a plurality of insert projections;
a first insert projection positioned at an inlet end of the insert; and
a first funnel projection positioned at an outlet end of the insert and extending in a direction of a central axis of the funnel from an outlet portion of the funnel to an inlet portion of the funnel, and the first funnel projection forming a pocket positioned to prevent the insert from moving into the outlet portion of the funnel.

13. The system of claim 12, wherein the inlet portion of the funnel has a first circumference and the outlet portion of the funnel has a second circumference, the first circumference different than the second circumference.

14. The system of claim 12, wherein the insert is coupled to the inlet portion of the funnel, and wherein the funnel has a central axis along a longitudinal length of the funnel, the insert further having an axis substantially parallel to the central axis of the funnel, and an outer surface of the insert having a pin rib that mates with a ring collar at an inlet end of the funnel.

15. The system of claim 12, wherein the first insert projection spans a first axial length, and further comprising a second insert projection spanning a second axial length and a third insert projection spanning a third axial length.

16. The system of claim 12, wherein the at least one funnel projection extends along a longitudinal length of the funnel parallel to the central axis, and wherein the insert is positioned between the first funnel projection and an inner surface of the funnel.

17. A refueling structure for a filler pipe of a vehicle, comprising:
a funnel coupled to an inner circumference of the filler pipe, the funnel comprising a plurality of ribs extending toward an inlet portion of the funnel, the funnel further comprising a crescent-shaped anchor rib, one or more breaks in the anchor rib forming a reservoir, where the funnel includes a fence in an interior of the funnel, the fence having a plurality of apertures;
the plurality of ribs separating slots that form a fluid pathway from an interior of the funnel into the reservoir, the plurality of apertures fluidly coupled to the reservoir, the reservoir positioned on a side of a funnel wall; and
the reservoir positioned around an exterior of an outlet portion of the funnel, the plurality of apertures providing a venting path for fuel entering the funnel, where fuel from a fuel nozzle flows through the plurality of apertures and into the reservoir during refueling in order to reduce foaming and spitback resulting from fuel colliding with surfaces of the funnel.

18. The refueling structure of claim 17, wherein the funnel includes a central axis, wherein the plurality of ribs extends along a longitudinal length of the funnel parallel to the central axis, and wherein the plurality of ribs engages with the fuel nozzle or an insert sleeve during a refueling event.

19. The refueling structure of claim 18, wherein the inlet portion of the funnel has a first circumference and the outlet portion of the funnel has a second circumference, the first circumference different than the second circumference.

20. The refueling structure of claim 17, wherein the funnel includes a central axis, and wherein the anchor rib is positioned perpendicular to the central axis, a flat surface of the anchor rib facing towards the fuel nozzle and away from a fuel tank of the vehicle during a refueling event.

* * * * *